US012187065B2

(12) United States Patent
Suyal

(10) Patent No.: US 12,187,065 B2
(45) Date of Patent: Jan. 7, 2025

(54) SECURITY DEVICES

(71) Applicant: Optrical Limited, South Yorkshire (GB)

(72) Inventor: Navin Suyal, South Yorkshire (GB)

(73) Assignee: OPTRICAL LIMITED, South Yorkshire (GB)

( * ) Notice: Subject to any disclaimer, the term of this patent is extended or adjusted under 35 U.S.C. 154(b) by 0 days.

(21) Appl. No.: 17/763,832

(22) PCT Filed: Sep. 24, 2020

(86) PCT No.: PCT/EP2020/076770
§ 371 (c)(1),
(2) Date: Mar. 25, 2022

(87) PCT Pub. No.: WO2021/058671
PCT Pub. Date: Apr. 1, 2021

(65) Prior Publication Data

US 2022/0339958 A1 Oct. 27, 2022

(30) Foreign Application Priority Data

Sep. 26, 2019 (GB) ..................................... 1913913

(51) Int. Cl.
*B42D 25/00* (2014.01)
*B42D 25/342* (2014.01)
(Continued)

(52) U.S. Cl.
CPC ........... *B42D 25/342* (2014.10); *B42D 25/47* (2014.10); *G09F 3/0292* (2013.01); *G09F 3/0376* (2013.01); *G09F 2003/0257* (2013.01)

(58) Field of Classification Search
CPC .................................................... G09F 3/0292
See application file for complete search history.

(56) References Cited

U.S. PATENT DOCUMENTS

2011/0019283 A1 1/2011 Steenblik et al.

FOREIGN PATENT DOCUMENTS

KR 20200124491 A * 11/2020
WO 2011029602 A2 3/2011
(Continued)

OTHER PUBLICATIONS

KR20200124491A English Translation (Year: 2020).*
International Search Report for corresponding PCT Application No. PCT/EP2020/076770 dated Dec. 15, 2020, 4 pages.

*Primary Examiner* — Kyle R Grabowski
(74) *Attorney, Agent, or Firm* — Hoffman Warnick LLC

(57) ABSTRACT

A security device (1) comprising an optically transparent layer (3) including a repeating first array of separate optical focussing elements (3) (e.g. having translational symmetry) wherein a pitch distance between repeated elements in the first array is a first pitch value (A). The device also includes a repeating second array of separate image elements (6) (e.g. having translational symmetry) collectively defining an image viewable through the first part. The device is structured such that a pitch distance between repeated or successive elements in the second array is a second pitch value (B) wherein the ratio (A/B) of the first pitch value and the second pitch value has a value, A/B=n±Δ, that differs from a positive integer value, n, according to an absolute difference, Δ, not exceeding 0.01 and not less than 0.001.

18 Claims, 10 Drawing Sheets

(51) Int. Cl.

| | |
|---|---|
| ***B42D 25/47*** | (2014.01) |
| ***G09F 3/00*** | (2006.01) |
| ***G09F 3/03*** | (2006.01) |
| *G09F 3/02* | (2006.01) |

(56) References Cited

FOREIGN PATENT DOCUMENTS

| | | | | | |
|---|---|---|---|---|---|
| WO | WO-2011107782 | A1 | * | 9/2011 | ........... B42D 25/324 |
| WO | WO-2016198876 | A1 | * | 12/2016 | ............. B42D 25/29 |

* cited by examiner

SECURITY DEVICES

FIELD

The invention relates to security devices, such as anti-counterfeit and/or tamper-evident devices. For example, the invention relates to tamper-evident devices configured to reveal evidence of tampering via a change in the optical/visual properties thereof.

BACKGROUND

There is a need for devices that can be used to distinguish between an authentic product from one which is counterfeit or has been tampered with.

Existing tamper-proofing technologies often employ a break-away component on product packaging or containers, which cannot be re-attached to a packaging or product once opened. In other methods, product packaging or containers are glued shut in such a manner that tampering to open the package/product will distort or fracture the package/product noticeably.

More sophisticated security features enable instant authentication of packaging through visual inspection by the user without requiring expert knowledge. For example, a product marked with highly defined printed lines may be used to create complex designs that are difficult to copy. Engraved images, relief images, grids and patterns have been used in this regard.

Optically variable features affixed to products or packaging as anti-counterfeit devices, such as holograms, are common and effective overt security features. Examples are common on bank notes and credit cards. These enable packaging to be validated quickly and easily. They may provide a degree of anti-counterfeiting measure by virtue of their presence: put simply, they are difficult to copy convincingly and bad copies/counterfeits are obvious. However, they may not always be effective for tamper-proofing on packaging or containers. This is because packaging seals employing this type of technology could potentially be carefully removed from a package or container (e.g. with the help of some heat) allowing access within the package/container. The seal could potentially then be reattached as before, with no visible detriment to the optically variable feature carried by the seal The invention aims to provide an improved, or alternative, anti-counterfeit devices and tamper-evident security devices.

SUMMARY

The invention provides a security device comprising an optically transparent layer including a repeating first array of separate optical focussing elements (e.g. having translational symmetry) wherein a pitch distance between repeated elements in the first array is a first pitch value (A). The device also includes a repeating second array of separate image elements (e.g. having translational symmetry) collectively defining an image viewable through the first part. The device is structured such that a pitch distance between repeated or successive elements in the second array is a second pitch value (B) wherein the ratio (A/B) of the first pitch value and the second pitch value has a value, $A/B=n\pm\Delta$, that differs from a positive integer value, n, according to an absolute difference, A, not exceeding 0.01 and not less than 0.001.

Most preferably, the array of optical focussing elements comprises an array of lenticular lenses, e.g. exclusively lenticular lenses. A lenticular effect is most preferably achievable according to the invention, wherein Moire fringes are visibly present, as discussed herein.

In a lenticular configuration, according to preferred configurations of the invention, there is substantially no Moire magnification. Rather, each optical focusing element preferably comprises a lenticular lens whereby the array of lenticular lenses is arranged collectively to permit viewing of a particular part (e.g. the same part; e.g. a sub-array of image elements) of the whole image provided by (e.g. printed upon) the second part, at a first viewing angle. Thus, the array of lenses collectively form a viewed image, at that first viewing angle, based on the particular viewed part (i.e. the same part; e.g. sub-array) of the image elements provided by the second part. When the viewing angle is changed to a second viewing angle, the lenticular lens array may then present to the viewer a different part (i.e. another same part; e.g. a different sub-array of image elements) of the whole image, and this different part may define a different image as compared to the image viewed at the first viewing angle (e.g. different shape, content, colour etc.). This lenticular effect is achievable according to the invention, wherein Moire fringes are also present, as discussed herein. It is to be noted that the lenticular effect, and the occurrence of optical Moire fringes, is different and distinct from so-called Moire magnification. A discussion of such a Moire optical magnification can be found in:

M. C. Nutley, R. Hunt, R. F. Stephens, and P. Savander: "The Moire Magnifier"; Pure Appl. Opt. 3 (1994) 133-142.

As an illustrative example, to aid an understanding of the difference between Moire fringes produced by lenticular lenses, and Moire magnification using micro-lens arrays, FIG. 13 schematically shows the configuration required to achieve Moire magnification effect (also known, in the art, as an 'integral image' effect). This is caused by a periodic re-positioning/re-alignment or re-registration between lenses of the lens array and image elements of an underlying array of image elements. Consider an array of image elements (600) which comprises a regularly repeating sub-group which repeats along the array with a constant centre-to-centre spatial period (pitch) denoted "I" in FIG. 13. Each sub-group is identical to each other and comprises four image elements (A, B, C and D) arranged linearly in that spatial order. Overlying each sub-group of image elements is a lens of the array of lenses (500) arranged a regularly repeating array with a constant centre-to-centre spatial period (pitch) between lenses denoted "L" in FIG. 13. The whole of the array being magnified (i.e. all elements A to D of a sub-group) are within the width of one overlying lens.

The Moire Magnifier effect arises when a difference exists between the pitch of the lens array and the pitch of the sub-groups. The magnification factor is: $M=L/(L-I)$. Thus, if $(L-I)$ is small (i.e. L is close to I in value), then large magnifications are possible. For example a 1% relative difference in pitch produces a magnification of $M=100$.

In Moire Magnifier effect, the entirety of each sub-array image is below one respective lens of the lens array. This has the effect of magnifying the sub-array of image elements as shown schematically in FIG. 13, so that the image 'seen' by the viewer is a magnified version of the image formed by a sub-array of image elements.

A different effect, particular to lenticular lenses, is the lenticular effect provided by a positioning/alignment or registration between lenses of the lens array and image elements of an underlying array of image elements. In this case the full image is comprised of many finer image elements over a larger region, and not the magnification of a sub-array positioned underneath each lens. The repetition frequency of fine, single image elements may be of the same order as (or substantially the same as) that of the lenses.

The term 'absolute difference' refers to the absolute value, or magnitude, of a difference. The term 'repeated' includes a reference to a geometrical repetition, or translational symmetry, such as an ordered series or arrangement, or a regular spatial repetition, of elements (e.g. of the same shape or dimensions) to form a pattern defining a pitch distance between elements. This is without limitation to the content of each element. That is to say, successive elements (e.g. lines or stripes) may visibly differ within the visible bounds of the individual elements so compared (e.g. different colours, shades or surface appearance within each element e.g. line/stripe). The term 'pitch' is widely used to describe the distance between repeated elements in a structure possessing translational symmetry.

The limits $0.01 \geq \Delta \geq 0.001$ have been found to be those within which a practically useful visual effect can be produced. It is found that the visual effect is too distorted (practically lost) when the pitch difference is >0.01 whereas Moire fringes practically disappear for pitch difference values of <0.001. The value of the absolute difference ($\Delta$) preferably lies in the range $0.01 > \Delta \geq 0.001$. Preferably, $\Delta < 0.01$. More preferably $\Delta < 0.009$, or yet more preferably $\Delta < 0.008$. The value of the absolute difference ($\Delta$) preferably does not exceed 0.007, yet more preferably does not exceed 0.005 and even more preferably does not exceed 0.003. These limits or ranges help reduce, or effectively avoid, the aforementioned loss or distortion of the visual effect.

The value of the positive integer, n, may be n=1, or n=2, or n=3, or n=4, or n=5, or any other positive integer. Preferably, the value of the positive integer, n, is not greater than 10. More preferably, the value of the positive integer, n, is not greater than 5. Yet more preferably, the value of the positive integer, n, is not greater than 3. Preferably, the value of the positive integer, n, is n=1.

For example, the first pitch value A may be the pitch (e.g. centre to centre distance) of the lenses, while the second pitch value B may be the pitch between image elements in the form of fine printed lines collectively forming an image. As an example, the lenses may have a pitch of 37.04 μm while the printed lines are at a pitch of 37.15 μm.

The repeating second array of separate image elements may comprise two or more sub-arrays of image elements each one of which collectively presents distinct respective image. The resulting two or more respective images may be located adjacent to each other, or one may be embedded within (surrounded by) one of the other images. The images may be ikons, numbers or a combination of ikons and numbers. In this case, the second pitch value (B) for one of the sub-arrays may differ from the second pitch value (B) for one or more of the other sub-arrays. The result is that the optical effect presented by one sub-array differs from that presented by the one or more other sub-arrays. This may produce a visually striking contrast. The ratio A/B in respect of one sub-array may be $A/B=n+\Delta$ while the ratio A/B in respect of the rest of the image elements (e.g. one or more of the other sub-arrays) may be $A/B=n-\Delta$. For example, one image may be formed from image elements complying with the ratio $A/B=n+\Delta$ and embedded within that image may be one or more ikons or symbols complying with the ratio $A/B=n-\Delta$. In another example, one image may be formed from image elements complying with the ratio $A/B=n+\Delta$ and adjacent to that image may be one or more ikons or symbols complying with the ratio $A/B=n-\Delta$.

The optical focussing elements are aligned with respect to the image elements to reveal the image together with one or more Moire fringes that show 3-dimensional (3D) depth as the image viewing angle changes. The security device may be an anti-counterfeit device in which case the optical focussing elements may be aligned with respect to the image elements in a fixed or permanent manner. Alternatively, the security device may be a tamper-evident device in which case the optical focussing elements may be aligned with respect to the image elements in a releasable, detachable or removable manner.

The security device may be implemented as (or as part of) a label, sticker, or other attachment device, arranged for attachment or affixing to a product requiring the security provided by the device.

The security device may have a first part comprising the optically transparent layer, and a separate second part comprising the second array of separate image elements.

When the security device is a tamper-evident device, then an optically transparent release layer is provided between the first part and the second part which retains the optical focussing elements aligned with respect to the image elements to reveal the image together with one or more Moire fringes that show 3-dimensional (3D) depth as the image viewing angle changes. When the security device is a tamper-evident device, then the first part is mechanically separable from the second part by release of the release layer. The release layer may comprise a continuous layer of adhesive material or may comprise a discontinuous layer of adhesive material. When a discontinuous layer, the adhesive material may be provided as a patterned layer of discontinuous patches, spots, stripes or other pattern of separate and separated adhesive material, collectively forming the release layer.

The 3D effect is found to be such that the Moire fringes appear to be static upon a plane that is offset either behind the plane of the image formed by/on the second part or in front that image depending on whether the absolute difference renders the ratio of pitches less than or greater than n (n=a positive integer). It is found that when the viewer changes his/her angle of view of the image formed by/on the second part, the Moire fringes appear to move relative to that image at a rate of motion which is sympathetic and reciprocal to the change in viewing angle in such a way as to realistically mimic a parallax effect. This parallax effect gives the impression of a 3D depth.

In this way, a security device (e.g. anti-counterfeit or tamper-evident device) is provided which produces a distinctive visual effect (Moire fringes) in over an optical image. When the security device is a tamper-evident device, it is the distinctive visual effect that is destroyed when the parts of the device are separated in response to tampering actions involving an attempt to remove (e.g. peal or pull) the device from a product or package. The absence of the distinctive visual effect indicates that tampering has occurred, or that the device being viewed is a counterfeit device.

The device may provide at least two (2) Moire fringes apparent and visible via the optical focussing elements. The device may provide at no more than ten (10) Moire fringes apparent and visible via the optical focussing elements. The preferred number of Moire fringes visible concurrently is between 3 and 6, e.g. preferably 4 or 5. It has been found that too many Moire fringes (e.g. >10) causes an over-crowding of fringes and the loss of a clear 3D effect. The number of concurrently visible Moire fringes may be controlled by controlling/selecting the value of the positive integer, n, appropriately. Larger values of this positive integer result in a greater number of concurrently visible Moire fringes. The ratio (A/B) of the first pitch value and the second pitch value may have a value (A/B=n−Δ) that is less than the integer value (n). The result is that the 3D depth of the Moire fringes appears to place the Moire fringes in front of the image. The ratio (A/B) of the first pitch value and the second pitch value may have a value (A/B=n+Δ) that is greater than the integer value (n). The result is that the 3D depth of the Moire fringes appears to place the Moire fringes behind the image.

The range in the value of the absolute difference (Δ) at which the 3D effect is apparent is narrow, and if the absolute difference (Δ) falls outside this range then it has been found that the 3D effect vanishes and the Moire fringes appear to reside in the same plane as the image formed by/on the second part.

When the security device is a tamper-evident device, the release layer may be configured to release the first part from the second part in response to a release force (e.g. pealing forces) that is weaker than the pealing force required to remove the second part from a product or package to which it is to be applied, or is applied in use. The release layer may comprise an adhesive layer configured for this purpose. Preferably, the adhesive layer is arranged such that a peel strength required to release first part from second part is not greater than is required for a manual peeling action. The release layer is preferably arranged such that a peel strength required to release first part from second part is not greater than 300 gm/inch (11.81 kg/m), and even more preferably in the range of 50 m/inch to 250 gm/inch (1.97 kg/m to 9.84 kg/m). The adhesive layer may be arranged to release the first part from the second part upon application of a tensile strain.

The security device (whether a tamper-evident device or an anti-counterfeit device) may include an adhesive affixing layer for use in affixing the device to a surface of a product or package. When the security device is a tamper-evident device, the adhesive strength of the affixing layer is preferably greater than the adhesive strength of the release layer. The result is that an attempt to pull the tamper-evident device from a surface to which it is affixed desirably results in release of the first part from the second part without removal of the second part from the surface it is adhered to. Consequently, the tampered-with device remains upon the product or packaging as visible evidence that tempering has occurred.

The security device may comprise a label, tape, covering or binding to be applied to a product or packaging in such a way as to require the application of force to the device to remove it. The security device may define a label, tape, covering or binding in which an adhesive affixing layer is disposed on a surface of the second part. When the security device is a tamper-evident device, the adhesive affixing layer is disposed on a surface of the second part other than between the second part and the first part. Desirably, the adhesive affixing layer is tacky for affixing the label, tape, covering or binding to a surface (e.g. a surface of a product or packaging).

When the security device is a tamper-evident device, the security device may comprise a pull-tab with which the first part may be pulled/peeled from the second part. The pull-tab preferably bears none of the release layer and none of the affixing layer. The pull-tab may be an integrally formed part of the first part accessible and configured for manually gripping between a finger and thumb of a human hand. In the tamper-evident security device, the first part, the second part and the release layer collectively may define a laminate. In the anti-counterfeit security device, the first part and the second part collectively may define a laminate.

When the security device is a tamper-evident device, the release layer may comprise an adhesive layer arranged to be not re-adherent to the first part or the second part after a said release of the release layer from the first part or the second part, respectively. Consequently, once the first part has been released from the second part, and the distinctive visual effect (Moire fringes) has been destroyed, the first part cannot be re-adhered to the second part directly using the release layer. This obstructs attempts to 'cover-up' the evidence of tampering by attempting to reinstate the distinctive visual effect (Moire fringes). In fact, the occurrence of the distinctive visual effect (Moire fringes) relies on a careful alignment and precise separation/positioning of the first and second parts which is not practically/realistically achievable simply by manually trying to re-adhere the two parts in situ, when released by tampering.

Desirably, in the security device, each one of said optical focussing elements is aligned to reveal therethrough a view of a respective one of said image element(s), and each said optical focussing element defines a focal point coinciding with the location of a respective said image element with which it is aligned.

Preferably, some or each of said optical focussing elements define a respective optical aperture the width dimension of which does not exceed 100 μm. Preferably, some or each of said image elements has such width dimension not exceeding 100 μm, or more preferably between 50 μm and 30 μm.

Desirably, some or each of said optical focussing elements define a respective optical aperture the width dimension of which does not exceed 50 μm. Preferably, some or each of said image elements has such width dimension not exceeding 50 μm.

In the device, some or each of said optical focussing elements may have a focal length which does not exceed 200 μm. Preferably, a said optical focussing element comprises a lenticular lens.

The widths of image elements (e.g. printed lines) may be equal to or less than about ½, or about ⅓, or about ¼, or about ⅕, or about ⅙ (or generally about 1/m; m is a positive integer; e.g. m=n+1) of the aperture width of the associated lens (e.g. lenticular lens width). It is preferable to have thinner image elements, and preferably thinner than 100 μm, much more preferably thinner than 50 μm.

When the security device is a tamper-evident device, the release layer preferably retains the optical focussing elements in alignment with the array/pattern of image elements formed on the second part thereby in cooperation to reveal a predetermined optical effect according to the pattern. When the security device is an anti-counterfeit device, it is configured to fix the optical focussing elements in alignment with the array/pattern of image elements formed on the second part thereby in cooperation to reveal a predetermined optical effect according to the pattern.

The optical focusing elements most preferably are lenticular lenses, in which case the optical effect may include a lenticular effect. Examples of image element arrays/patterns on the second part include fine parallel lines which may be printed upon a surface of the second part. Successive such lines may be of alternating colour (e.g. interleaved lines) such that lines of one colour collectively define an image in one colour and interleaved lines of another colour collectively define an image in the other colour. This pattern may be used in combination with a lenticular lens array to produce a lenticular optical effect in which only the image of one colour is visible to users viewing from one viewing angle, whereas only the image of the other colour is visible to users viewing from another viewing angle.

The positioning may take the form of a particular angular alignment between an axis of the array of optical focussing elements, and an axis of the array of image elements. The respective array axes may be an axes lying with a plane of the arrays of focussing elements and image elements, respectively, associated with an array symmetry or structure/arrangement. The array of optical focussing elements and the array of image elements are preferably planar. The array of optical focussing elements and the array of image elements are preferably planar and mutually parallel. The positioning may take the form of a particular lateral alignment (e.g. a registration) between an optical axis of each optical focussing element, and an associated image element or group of image elements which are to be viewed through a particular optical focussing element. The positioning may take the form of a particular separation (e.g. transverse) between the array of optical focussing elements and the array of image elements.

When the security device is a tamper-evident device, the removal of the alignment/cooperation of the optical focussing elements and the respective image elements may thereby produce a perceptible change in the optical image/effect viewable before separation. If or when the two separated parts are returned in to contact, the optical image/effect achieved by the relative positioning of the pre-separation alignment/cooperation is altered (or not achieved at all) perceptibly.

Desirably, an (e.g. each) optical focussing element defines a focal length which substantially matches the separation between array of separate optical focussing elements and the array of image elements.

Desirably not only the second part of the security device contains image elements, but also the first part of the security device may also contain image elements. For example, the first part of the security device may comprise a first sub-array of image elements disposed upon an underside surface of the (e.g. flexible transparent plastic layer) first part. The first part of the security device may comprise a first sub-array of optical focusing lenses disposed on the outer surface thereof (e.g. the transparent plastic layer). Each image element of the first sub-array of image elements may be in position/alignment with a respective optical focusing lens element of the first sub-array of optical focusing lenses. Each image element of the first sub-array of image elements may be positioned to reside at the focal length/point of the lens with which it is in position/alignment. Similarly, the second part of the security device may comprise a second sub-array of image elements disposed upon a surface thereof (e.g. a flexible transparent plastic layer) of the part. The first part of the security device may also comprise a second sub-array of optical focusing lenses disposed on the outer surface thereof (e.g. transparent plastic layer). Each image element of the second sub-array of image elements may be in position/alignment with a respective optical focusing lens element of the second sub-array of optical focusing lenses, and may also be positioned to be substantially coincident with the focal length/point of the lens within which it is in position/alignment.

Each of the first and second sub-arrays of image elements may be disposed upon a surface of the first or second part of the security device, respectively, as a printed layer of graphics. A layer of optically transparent and peelable adhesive may be disposed between the underside of the printed graphics layer containing the first sub-array of image elements and the upper side of the second part of the device. The first part of the device may be separated from the second part by release from the adhesive layer by applying a pulling force manually/mechanically to a tab which may be attached to the first part. The consequence of such release is to de-align the optical focusing elements of the lens array relative to the image elements of the second sub-array of image elements, while maintaining the optical focusing elements of the lens array in position/alignment relative to the image elements of the first sub-array of image elements. The visual effect may be to cause an optical image collectively defined by the second sub-arrays of lens elements and image elements to cease, while permitting a optical image collectively defined by the first sub-arrays of lens elements and image elements to continue. This obvious visual effect allows a user to determine when tampering with the device has taken place.

The focal length of the optical focusing elements of the first sub-array may be shorter than the focal length of the optical focusing elements of the second sub-array. Each optical focussing element may define a focal length which substantially matches the separation between array of separate optical focussing elements and the array of image elements it is so positioned (e.g. aligned) with. Desirably, an (e.g. each) optical focussing element defines a focal length which substantially matches the separation.

In an alternative, the second part of the security device may comprise a laminate of two sub-layers. Each of the two sub-layers may comprise a flexible transparent plastic layer. A first sub-layer of the two sub-layers may bear upon it a first sub-array of image elements (e.g. disposed upon an upper surface of a flexible transparent plastic layer). The first part of the security device may comprise a first sub-array of optical focusing elements disposed on the outer surface thereof. Each image element of the first sub-array of image elements may be in position/alignment with a respective optical focusing element of the first sub-array of optical focusing elements. In addition, each image element of the first sub-array of image elements may be positioned to reside at the focal length/point of the optical focusing element with which it is in position/alignment. The second part of the security device may comprise a second sub-layer of the two sub-layers which bears upon it a second sub-array of image elements (e.g. disposed upon an upper surface of that part). The first part of the security device may also comprise a second sub-array of optical focusing elements disposed on the outer surface thereof. Each image element of the second sub-array of image elements may be in position/alignment with a respective optical focusing element of the second sub-array of optical focusing elements, and may be also positioned to be substantially coincident with the focal length/point of the optical focusing element with which it is in position/alignment.

In an alternative, the first sub-array of image elements may be printed as a layer upon the upper side (e.g. transparent plastic layer) of the second part. In this variant, the second part may have a first sub-array of image elements printed on one side (e.g. upper side) nearest to the lens array, and a second sub-array of image elements printed on the other side (e.g. under side) furthest from the lens array. The peelable adhesive layer may be sandwiched between the e.g. transparent plastic layer of the first part, and the printed layer bearing the first sub-array of image elements. Application of a peeling force to the e.g. transparent plastic layer of the first part causes it, and the array of lens elements residing on its upper side, to be released from the second part and de-aligned from the first sub-array of image elements as well as from the second sub-array of image elements.

In a second aspect, the invention may provide a method of manufacturing a security device comprising, providing an optically transparent layer including a repeating first array of separate optical focussing elements (e.g. having translational symmetry) wherein a pitch distance between repeated elements in the first array is a first pitch value (A). The method includes providing a repeating second array of separate image elements (e.g. having translational symmetry) collectively defining an image viewable through the first part wherein a pitch distance between repeated elements in the second array is a second pitch value (B) wherein the ratio (A/B) of the first pitch value and the second pitch value has a value $A/B=n\pm\Delta$, that differs from a positive integer value, n, according to an absolute difference, A, not exceeding 0.01 and not less than 0.001.

The optical focussing elements are thereby aligned with respect to the image elements to reveal the image together with one or more Moire fringes that show 3-dimensional (3D) depth as the image viewing angle changes. The security device may be an anti-counterfeit device in which case the optical focussing elements may be aligned with respect to the image elements in a fixed or permanent manner. Alternatively, the security device may be a tamper-evident device in which case the optical focussing elements may be aligned with respect to the image elements in a releasable, detachable or removable manner.

The method may include providing a first part comprising the optically transparent layer, and providing a separate second part comprising the second array of separate image elements.

When the security device is an tamper-evident device, the method may also include providing an optically transparent release layer between the first part and the second part which retains the optical focussing elements aligned with respect to the image elements to reveal the image together with one or more Moire fringes, wherein the first part is mechanically separable from the second part by release of the release layer.

The method may include disposing a second adhesive layer on a surface of the second part to define a sticky label, wherein the second adhesive layer is tacky for affixing the label to a surface. The second adhesive may be disposed on the second part at a place other than between the second part and the first part to define a sticky label.

The method may include applying the label to a surface of a package, packaging or product.

The invention, in any aspect, may provide an anti-counterfeit device or a tamper-evident device, an anti-counterfeit label or a tamper-evident label, an anti-counterfeit seal or a tamper-evident seal, an anti-counterfeit optical device or a tamper-evident optical device, a lenticular anti-counterfeit device or a lenticular tamper-evident device, or a lenticular device.

BRIEF DESCRIPTION OF DRAWINGS

There now follow examples and embodiments of the invention, which are useful for a better understanding of the invention, with reference to the following figures, of which.

DESCRIPTION OF EMBODIMENTS

Figure 1:
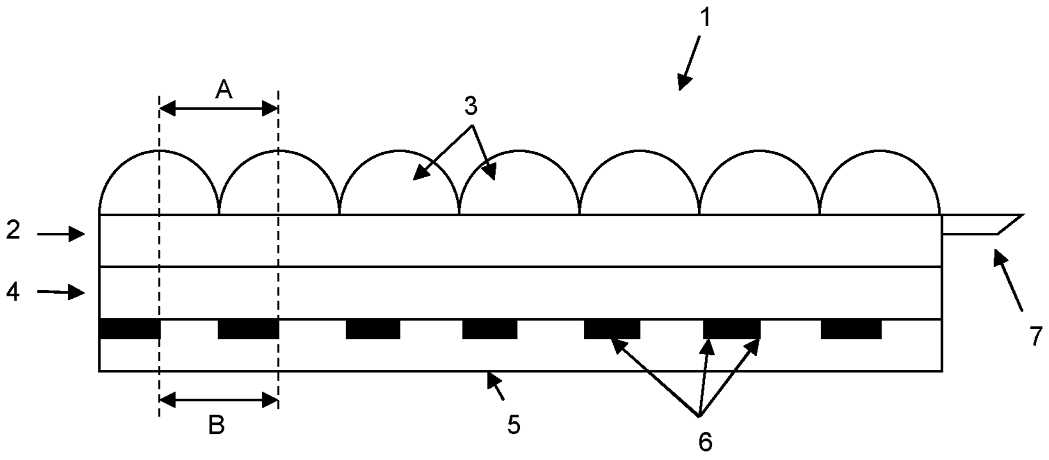
FIG. 1 schematically illustrates a cross-sectional view of a tamper-evident device according to an embodiment of the invention.

In the drawings, like items are assigned like reference signs.

Figure 10:
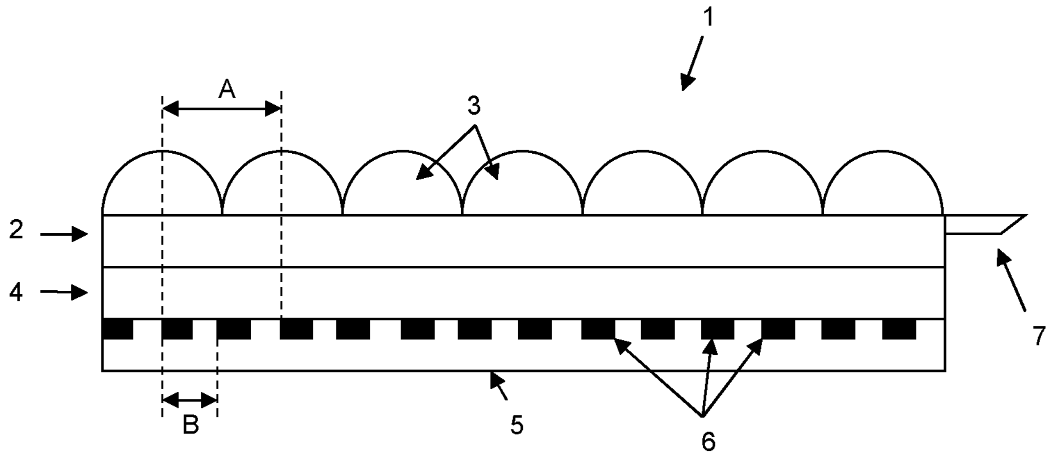
FIG. 10 schematically illustrates a cross-sectional view of a tamper-evident device according to an embodiment of the invention.

Referring to FIG. 1, and to FIG. 10, there is illustrated a tamper-evident security device (1) in the form of a label, or tape, or sheet, comprising a first part consisting of an optically transparent and flexible plastic layer (2) including upon an upper surface thereof an array (3) of separate optical focussing elements each defining a lenticular optical lens. A second part of the device comprises an optically transparent and flexible plastic layer (5) including upon an upper surface thereof a printed array (6) of separate image elements collectively defining an image viewable through the first part (1 & 3) when each of the optical focussing lenses is positioned over respective image elements (6)—as is shown in FIG. 1, and in FIG. 10.

An optically transparent and manually peelable adhesive release layer (4) is disposed between the first part and the second part. This release layer retains the optical focussing lens elements (5) positioned over with the image elements (6) thereby in cooperation to reveal the image as an optical image. The first part (2) is mechanically separable from the second part (5), for example by peeling or by applying a tensile stress longitudinally to the device, to release either the first part or the second part from the release layer, to cease the cooperation of the lenticular lenses (3) with the image elements (6). A pull-tab (7) is attached to a terminal end of the label at an edge of the transparent flexible layer (2) of the first part. The pull-tab is dimensioned to permit a user to hold the tab between finger and thumb, and to pull in a direction which is both transverse to the plane of the label and away from the second part (5).

Figure 2:
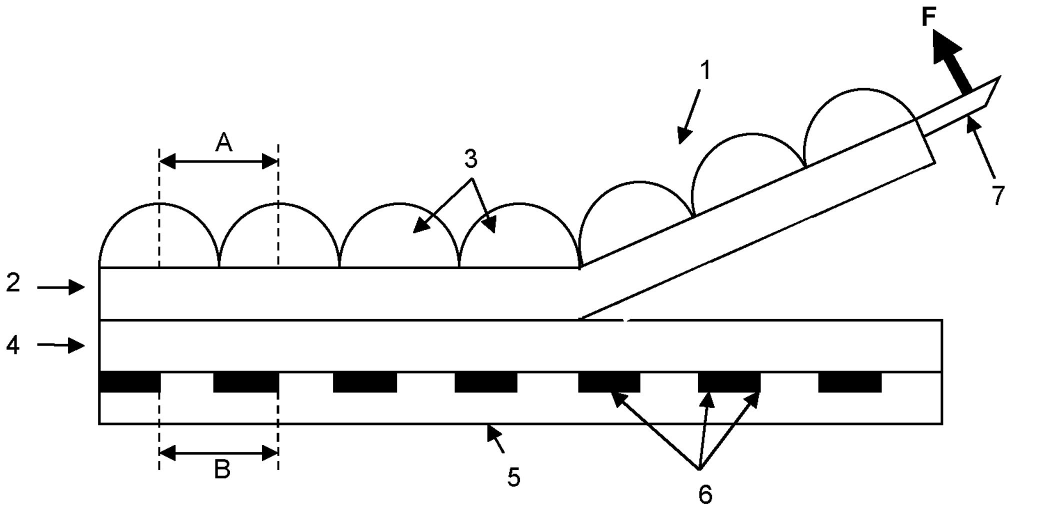
FIG. 2 schematically illustrates a cross-sectional view of a tamper-evident device of FIG. 1 as a label being separated by application of a peeling force (F), according to an embodiment of the invention.

The release layer (4) is arranged to permit such peeling separation upon application of a peeling force of any suitable and appropriate magnitude falling within a range values manually manageable by a user and typically employed in manually peeling labels, as would be readily apparent to the person skilled in the art. The peel strength may be not greater than 300 gm/inch (11.81 kg/m), and even more preferably in the range of 50 m/inch to 250 gm/inch (1.97 kg/m to 9.84 kg/m). FIG. 2 schematically shows such a separation by application of a peeling force (F) in a direction which is both transverse to the plane of the label and away from the second part.

Each lenticular lens (3) has a focal length defining a focal point residing upon the surface of the second part (5) of the device bearing the image elements (6) of the device which underlie the lens in question.

The pitch/period 'B' of the image elements (6), e.g. the spatial distance between corresponding parts of successive elements in the array, differs relative to the pitch/period 'A' of lenses of the lens array by a factor differing from the integer value n=1, for FIG. 1 and FIG. 2, or from the integer value n=2 for FIG. 10, in a small but tightly constrained way. In particular, both the lenticular lens array (3) and the array of image elements (6) have translational symmetry along a common direction of translation. That direction is perpendicular to the longitudinal axis of the lenticular lenses, and parallel to the plane of the lens array and the array of image elements. This symmetry provides a pitch distance between repeated elements in the lens array (3) which has a fixed first pitch value (A), and a pitch distance between repeated elements in the image (6) has a fixed second pitch value (B).

In FIGS. 1 and 2, the ratio (A/B) of the first pitch value and the second pitch value has a value ($A/B=1\pm\Delta$) that differs from 1 (one) by a non-zero absolute difference ($\Delta$) not exceeding 0.01 and not less than 0.001. In this example, $\Delta=0.003$. The focal length of each lenticular lens, and the separation between the array of lenses (3) and the array of image elements (6), is such that the focal point of each lens coincides with the plane containing the array of image elements (6).

The optical effect of this is that the lens array (3) reveals the image formed by the image elements collectively (6), together with one or more Moire fringes that show 3-dimensional (3D) depth as the image viewing angle changes. For example, the value of 'B' may be selected during the manufacturing process to be a suitable value to achieve a desired number of Moire fringes when the image is viewed, in use of the device. This may be done with the value of '$\Delta$' kept constant: it is easier (cheaper) to change the pitch of the printed pattern of image elements on the second part of the device, than it is to change the pitch of the lenticular lenses of the lens array. In an example, one may employ B=37.15 μm, or A=37.04 μm. These values, when used with a lens array constrained such that: A/B=0.997 (i.e. 1−0.003) may produce a pattern of Moire fringes showing two, three or more Moire fringes that appear to 'float' in a plane positioned above the plane of the image formed by the array of image elements (6). Alternatively, if B=36.93 μm, or A=37.04 μm A/B=1.003 (i.e. 1+0.003), then this arrangement may produce a pattern of Moire fringes showing two, three or more Moire fringes that appear to 'float' in a plane positioned below the plane of the image formed by the array of image elements (6). The number of Moire fringes presented to the viewer may be controlled by controlling the value of the absolute difference ($\Delta$; here n=1). It has been found that the 3D effect of the Moire fringes disappears when value of the absolute difference ($\Delta$) is less than 0.001. The result is that the Moire fringes appear to reside in the same plane as the image formed by/on the second part.

The 3D effect is found to be such that the Moire fringes appear to be static upon a plane that is offset either behind the plane of the image formed by/on the second part or in front that image depending on whether the absolute difference renders the ratio of pitches greater than or less than the integer value, n (n=1 in this example). It is found that when the viewer changes his/her angle of view of the image formed by/on the second part, the Moire fringes appear to move relative to that image at a rate of motion which is sympathetic and reciprocal to the change in viewing angle in such a way as to realistically mimic a parallax effect. This parallax effect gives the impression of a 3D depth.

In order to illustrate another example, in FIG. 10, the value of the integer 'n' is n=2, such that: $A/B=2+\Delta$, or $A/B=2-\Delta$.

The ratio (A/B) of the first pitch value and the second pitch value may have a value ($A/B=n+\Delta$) that is greater than n (integer). The result is that the 3D depth of the Moire fringes appears to place the Moire fringes behind the image. FIGS. 3A, 3B, 4A, 4B, 5A and 5B show a schematic example of this.

Figure 3A:
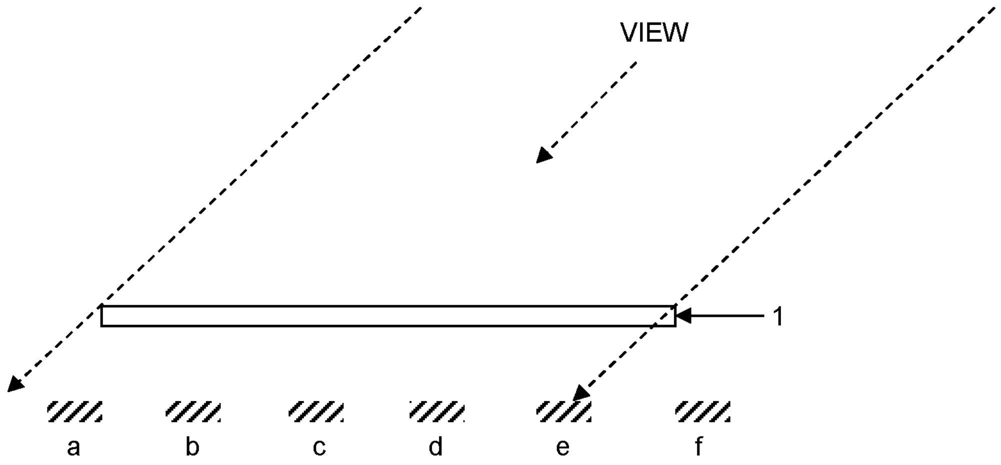
FIGS. 3A and 3B schematically illustrate a view of a tamper-evident device according to an embodiment of the invention, demonstrating the appearance of a 3D optical effect including Moire fringes showing parallax and depth, according to a lenticular-type optical effect.
Figure 3B:
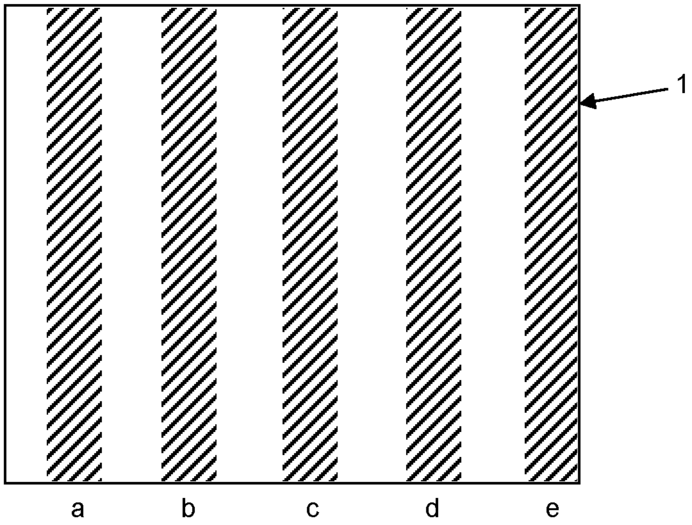

FIG. 3A schematically illustrates a side/edge view of the tamper-evident device (1) of FIG. 1 when in the form of a sheet and indicates a direction from which a viewer may view the device, when in use. FIG. 3B shows a pattern of five Moire fringes that would be seen by the viewer from their viewing position shown in FIG. 3A. The device would also present to the viewer an image formed by the collective effect of the image elements (6) patterned upon the surface of the second part (5) of the device as viewed through the lenticular lens sheet (2, 3) of the device, however, that image is not shown in FIG. 3B in order to aid clarity.

FIG. 3A shows a viewing position to the right hand side of the device (1). Five Moire fringes (a, b, c, d and e) are apparent to the viewer as being 'underneath' the plane of the device (1). FIG. 3B shows the view the viewer sees, and the five Moire fringes positioned relative to the peripheral edges/frame of the device (1).

Figure 4A:
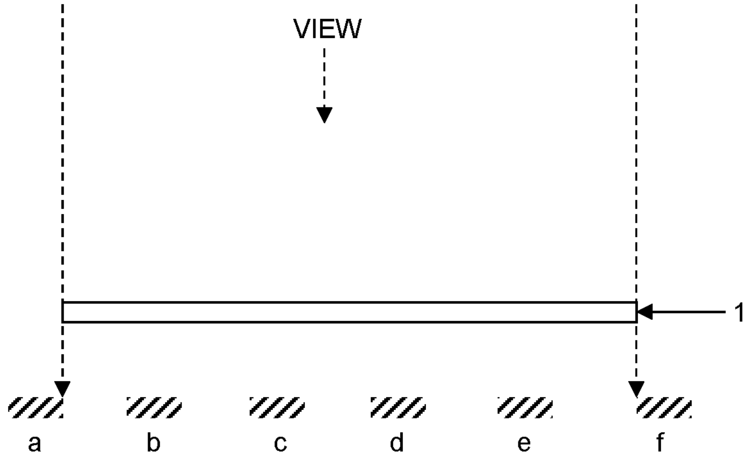
FIGS. 4A and 4B schematically illustrate a view of a tamper-evident device according to an embodiment of the invention, demonstrating the appearance of a 3D optical effect including Moire fringes showing parallax and depth, according to a lenticular-type optical effect.
Figure 4B:
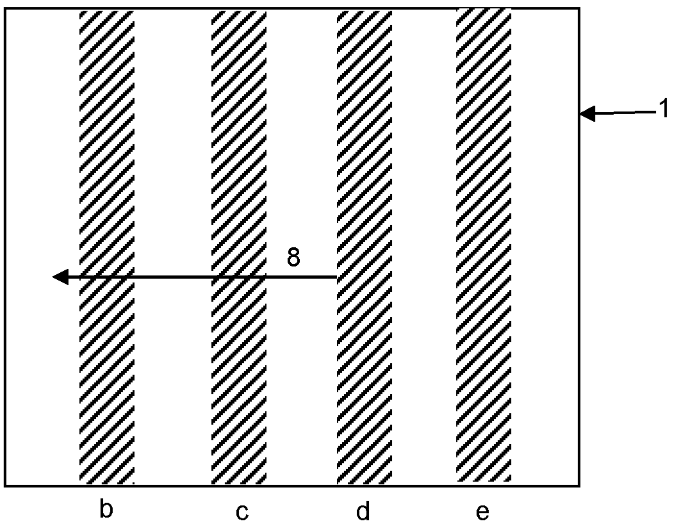

FIG. 4A schematically illustrates a side/edge view of the tamper-evident device (1) of FIG. 1 when in the form of a sheet and indicates a direction from which a viewer may view the device, when in use. FIG. 4B shows a pattern of four Moire fringes that would be seen by the viewer from their viewing position shown in FIG. 4A. The device would also present to the viewer an image formed by the collective effect of the image elements (6) patterned upon the surface of the second part (5) of the device as viewed through the lenticular lens sheet (2, 3) of the device, however, that image is not shown in FIG. 4B in order to aid clarity.

FIG. 4A shows a viewing position directly above the device (1). From this position, only four of the five Moire fringes (b, c, d and e) are apparent to the viewer. A fifth of the Moire fringes (fringe 'a') is lost 'underneath' the frame/edge of the device (1). FIG. 4B shows the view the viewer sees, and the four Moire fringes positioned relative to the peripheral edges/frame of the device (1). It can be seen that the position of the four visible fringes relative to the frame/edge of the device has changed relative to the positions they had when viewed from the right hand side (FIG. 3B). This is perceived by the viewer as a parallax motion (8) of the fringes from the right to the left, and reinforces a perception of 3D depth.

Figure 5A:
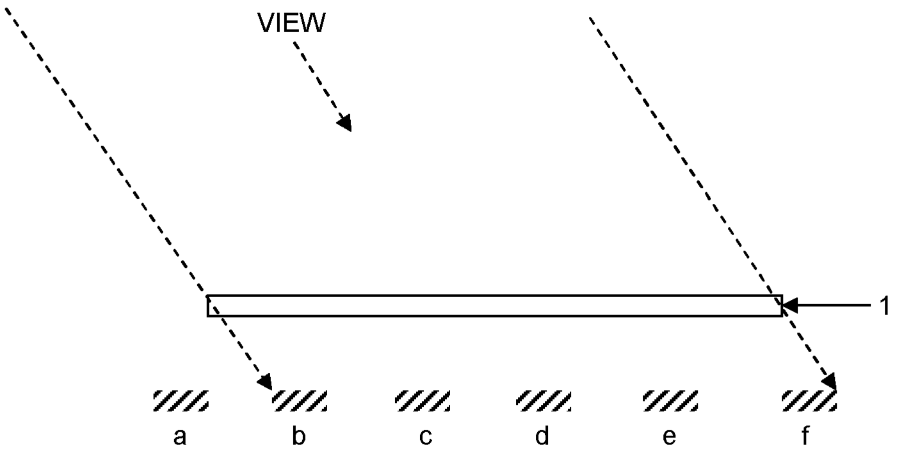
FIGS. 5A and 5B schematically illustrate a view of a tamper-evident device according to an embodiment of the invention, demonstrating the appearance of a 3D optical effect including Moire fringes showing parallax and depth, according to a lenticular-type optical effect.
Figure 5B:
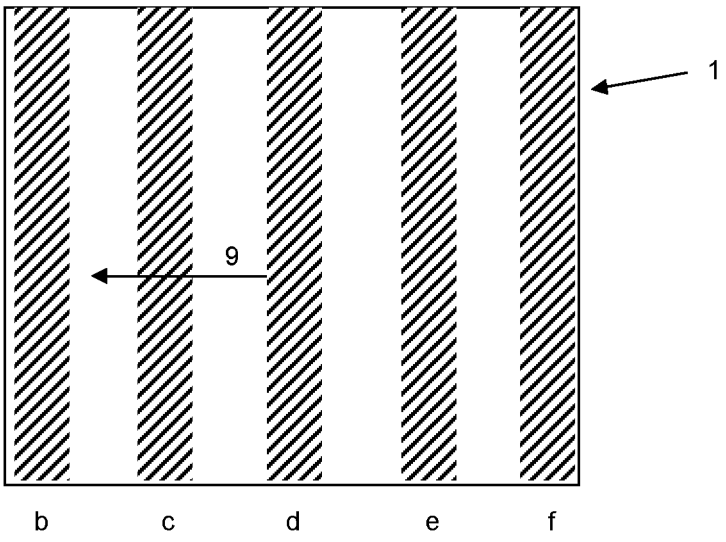

FIG. 5A schematically illustrates a side/edge view of the tamper-evident device (1) of FIG. 1 when in the form of a sheet and indicates a direction from which a viewer may view the device, when in use. FIG. 5B shows a pattern of five Moire fringes that would be seen by the viewer from their viewing position shown in FIG. 5A. The device would also present to the viewer an image formed by the collective effect of the image elements (6) patterned upon the surface of the second part (5) of the device as viewed through the lenticular lens sheet (2, 3) of the device, however, that image is not shown in FIG. 5B in order to aid clarity.

FIG. 5A shows a viewing position to the left hand side of the device (1). From this position, five Moire fringes (b, c, d, e and f) are apparent to the viewer. A new fifth of the Moire fringe (fringe 'f') is uncovered from 'underneath' the frame/edge of the device (1). FIG. 5B shows the view the viewer sees, and the five Moire fringes positioned relative to the peripheral edges/frame of the device (1). It can be seen that the position of the five visible fringes relative to the frame/edge of the device has changed relative to the positions they had when viewed from the right hand side (FIG. 3B) or from the central position (FIG. 4B). This is perceived by the viewer as a parallax motion (9) of the fringes from the right to the left, and reinforces a perception of 3D depth.

The ratio (A/B) of the first pitch value and the second pitch value may have a value ($A/B=n-\Delta$) that is less than n (integer). The result is that the 3D depth of the Moire fringes appears to place the Moire fringes in front of the image. FIGS. 6A, 6B, 7A, 7B, 8A and 8B show a schematic example of this.

Figure 6A:
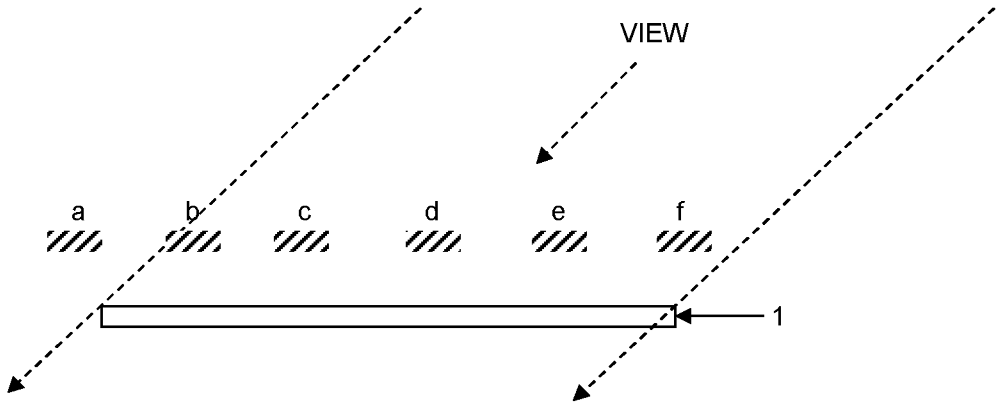
FIGS. 6A and 6B schematically illustrate a view of a tamper-evident device according to an embodiment of the invention, demonstrating the appearance of a 3D optical effect including Moire fringes showing parallax and depth, according to a lenticular-type optical effect.
Figure 6B:
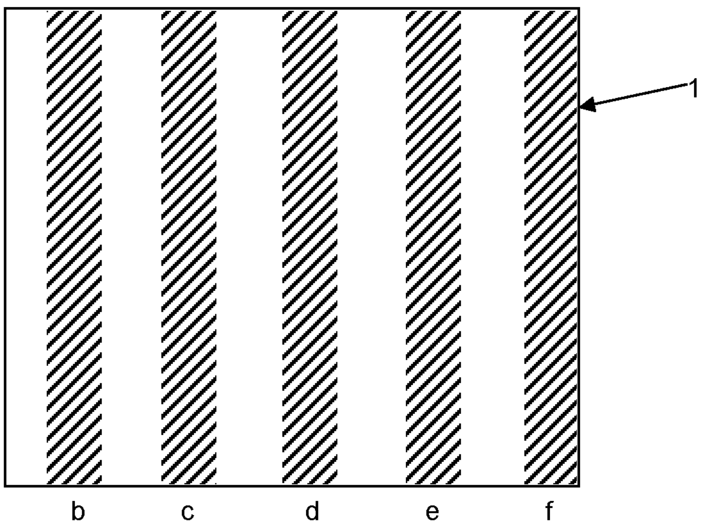

FIG. 6A schematically illustrates a side/edge view of the tamper-evident device (1) of FIG. 1 when in the form of a sheet and indicates a direction from which a viewer may view the device, when in use. FIG. 6B shows a pattern of five Moire fringes that would be seen by the viewer from their viewing position shown in FIG. 6A. The device would also present to the viewer an image formed by the collective effect of the image elements (6) patterned upon the surface of the second part (5) of the device as viewed through the lenticular lens sheet (2, 3) of the device, however, that image is not shown in FIG. 6B in order to aid clarity.

FIG. 6A shows a viewing position to the right hand side of the device (1). Five Moire fringes (b, c, d, e and f) are apparent to the viewer as being 'above' the plane of the device (1). FIG. 6B shows the view the viewer sees, and the five Moire fringes positioned relative to the peripheral edges/frame of the device (1).

Figure 7A:
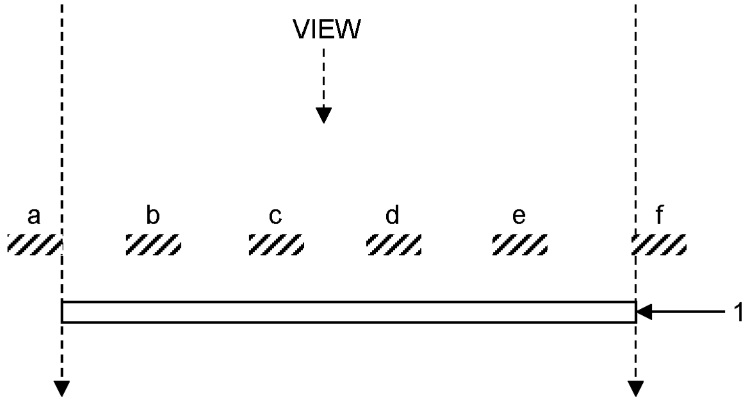
FIGS. 7A and 7B schematically illustrate a view of a tamper-evident device according to an embodiment of the invention, demonstrating the appearance of a 3D optical effect including Moire fringes showing parallax and depth, according to a lenticular-type optical effect.
Figure 7B:
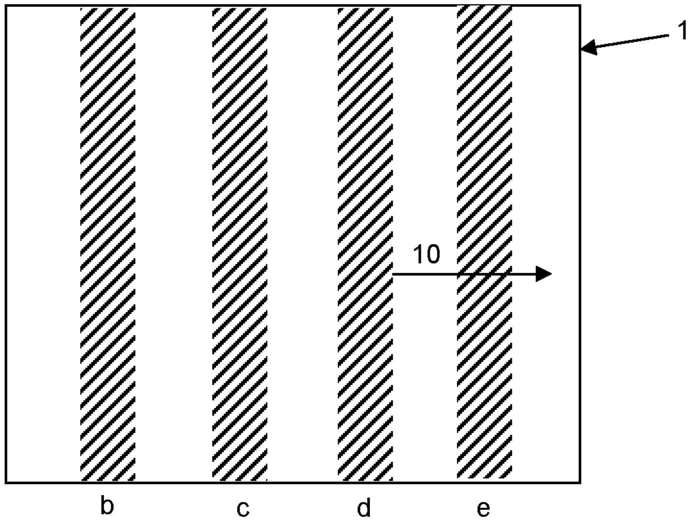

FIG. 7A schematically illustrates a side/edge view of the tamper-evident device (1) of FIG. 1 when in the form of a sheet and indicates a direction from which a viewer may view the device, when in use. FIG. 7B shows a pattern of four Moire fringes that would be seen by the viewer from their viewing position shown in FIG. 7A. The device would also present to the viewer an image formed by the collective effect of the image elements (6) patterned upon the surface of the second part (5) of the device as viewed through the lenticular lens sheet (2, 3) of the device, however, that image is not shown in FIG. 7B in order to aid clarity.

FIG. 7A shows a viewing position directly above the device (1). From this position, only four of the five Moire fringes (b, c, d and e) are apparent to the viewer. A fifth of the Moire fringes (fringe 'f') is lost 'over' the frame/edge of the device (1). FIG. 7B shows the view the viewer sees, and the four Moire fringes positioned relative to the peripheral edges/frame of the device (1). It can be seen that the position of the four visible fringes relative to the frame/edge of the device has changed relative to the positions they had when viewed from the right hand side (FIG. 6B). This is perceived by the viewer as a parallax motion (10) of the fringes from the left to right, and reinforces a perception of 3D depth.

Figure 8A:
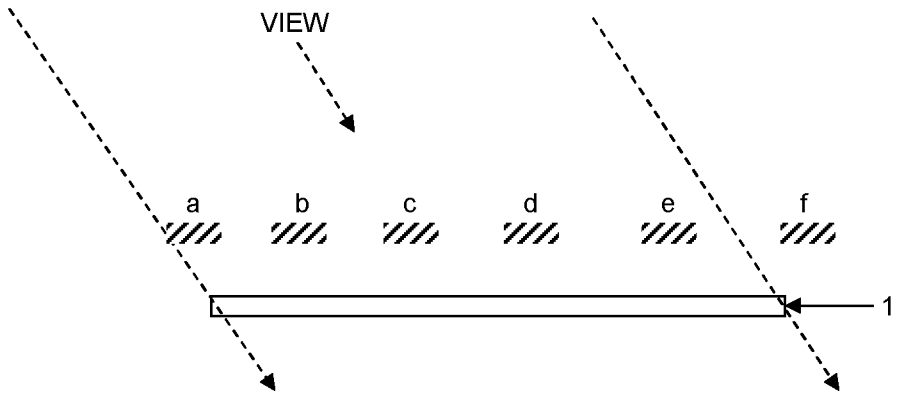
FIGS. 8A and 8B schematically illustrate a view of a tamper-evident device according to an embodiment of the invention, demonstrating the appearance of a 3D optical effect including Moire fringes showing parallax and depth, according to a lenticular-type optical effect.
Figure 8B:
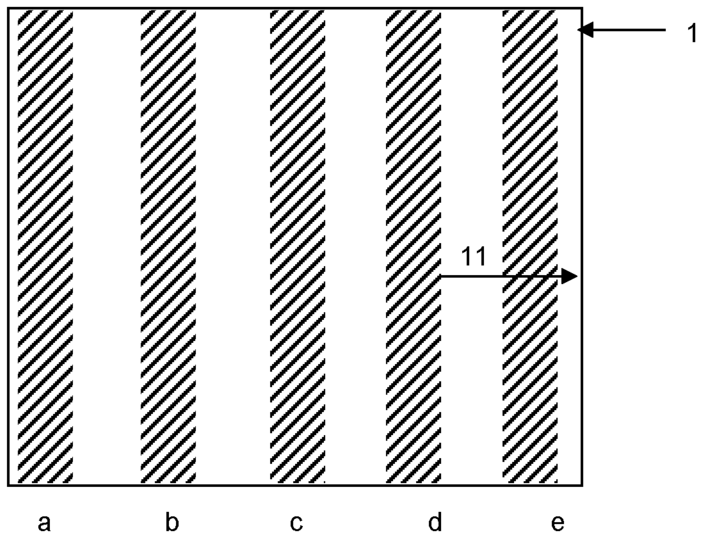

FIG. 8A schematically illustrates a side/edge view of the tamper-evident device (1) of FIG. 1 when in the form of a sheet and indicates a direction from which a viewer may view the device, when in use. FIG. 8B shows a pattern of five Moire fringes that would be seen by the viewer from their viewing position shown in FIG. 8A. The device would also present to the viewer an image formed by the collective effect of the image elements (6) patterned upon the surface of the second part (5) of the device as viewed through the lenticular lens sheet (2, 3) of the device, however, that image is not shown in FIG. 8B in order to aid clarity.

FIG. 8A shows a viewing position to the left hand side of the device (1). From this position, five Moire fringes (a, b, c, d and e) are apparent to the viewer. A new fifth of the Moire fringe (fringe 'a') is uncovered from 'over' the frame/edge of the device (1). FIG. 8B shows the view the viewer sees, and the five Moire fringes positioned relative to the peripheral edges/frame of the device (1). It can be seen that the position of the five visible fringes relative to the frame/edge of the device has changed relative to the positions they had when viewed from the right hand side (FIG. 6B) or from the central position (FIG. 7B). This is perceived by the viewer as a parallax motion (11) of the fringes from the right to the left, and reinforces a perception of 3D depth.

In a preferred embodiment, a thin backing film (not shown) is first laminated on the front side (i.e. the lenses (3)) of the first part of the device, and a second adhesive (not shown) is applied to the bottom side of the second part (5) of the device. A protective liner (not shown) is applied over the exposed surface of the second adhesive layer. The device, when a label or tape, may be affixed to the package so as to place the label/tape over an edge of a lid/cover of the package when the lid/cover is in the closed position.

Figure 9:
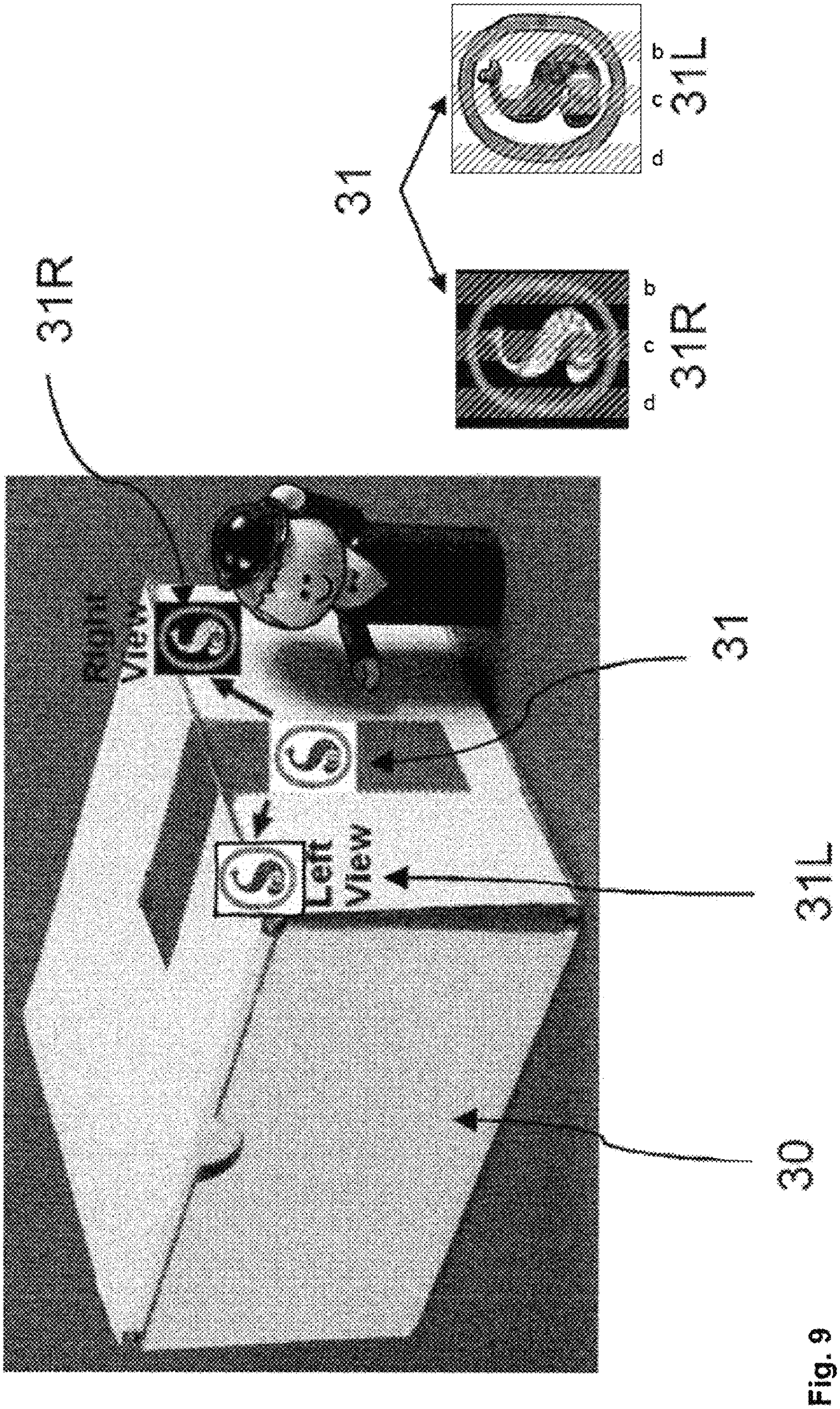
FIG. 9 shows a tamper-evident device according to an embodiment of the invention in the form of a label applied to packaging.

FIG. 9 shows a package (30) to which a label/tape (31) according to an embodiment of the invention, has been applied. While the first (2) and second (5) parts of the label/tape structure remain adhered together (i.e. the label/tape is not split), each lenticular lens of the array of lenses (3) of the first part remains so positioned over respective image elements (6) within the second part. The result is that the lenses and image elements, so positioned cooperate to collectively define an optical image of the printed image defined on the second part of the device by the image elements collectively. In this example, the desired optical effect is a lenticular optical effect. Accordingly, the image elements are each arranged relative to the respective lens (3), such that the printed image element is visible via the lens in question when the lens is viewed from one side (e.g. the right-hand-side) of the optical axis of the lens, but is not visible when through the lens when the lens is viewed from the opposite side of its optical axis (e.g. the left-hand-side).

As a result, a first image defined collectively by the printed image elements (6), may be made visible to a viewer when viewing the array of optical lenses (3) from one side of the optical axes of the lenses of the array (which have optical axes in parallel), whereas a different image defined collectively by the areas between printed image elements (6), may be made visible to a viewer when viewing the array of optical lenses (3) from the opposite side of the optical axes of the lenses of the array. FIG. 9 illustrates an example of this effect wherein a first optical image (31L) of the array of image elements is presented by the array of lenses when viewed from the left-hand-side of the optical axes of the lenses, whereas a second optical image (31R) of the regions between image elements, is presented by the array of lenses when viewed from the right-hand-side of the optical axes of the lenses. The second optical image is the 'negative' of the first optical image. This is achieved by providing (e.g. printing) image elements (6) of a first colour/shade (e.g. white) upon a surface having a different or complementary colour/shade (e.g. black).

FIG. 9 also schematically illustrates one example of a pattern of Moire fringes (fringes b, c and d of FIGS. 3A to 5B). The visible optical effect of a clear change in the viewed image and the apparent 3D depth of the plane on which the Moire fringes reside, depending on the angle of view, is schematically illustrated in FIG. 9 and provides a user with a clear indication of the integrity of the security device (e.g. a label example of FIG. 9). Simultaneously, three Moire fringes (b, c and d) are visible in both the left-side view (31L) and in the right-side view (31R) of the label. Most notably, the relative positioning of the three Moire fringes in the left-side view (31L) places them further to the left of the frame of the image (31) presented by the label, whereas the same three Moire fringes in the right-side view (31R) places them further to the right of the frame of the image. This appears as a parallax motion of the three Moire fringes and presents the appearance of the Moire fringes as being located on a plane displaced 'behind' the plane of the label.

It is to be noted that these effects are lost when the lenses are rendered no longer so positioned with respect to corresponding image elements. This loss of positioning/alignment is achieved e.g. by pealing the first part of the device from the second part, as described above, or by applying tensile stress to the device (e.g. tape/label) to cause a permanent change in the relative position between the lens elements and their respective image elements. It is practically impossible to re-position/align lenses and image elements after they have be de-aligned in this way, thereby preventing the person who has visibly tampered with the device from 'covering his tracks'.

Accordingly, a viewer is able to immediately determine whether or not the security device has been tampered with. Any tampering which has caused the array of lenses to be de-aligned from the underlying array of image elements, in the manner indicated in FIG. 2, causes the optical effect to cease. Even when the de-aligned lens array of the first part of the device, is lowered back into contact with the second part of the device (bearing the array of image elements) the necessary position/alignment between a given lens element and its associated image element is extremely difficult if not practically impossible to achieve manually.

Thus, the invention may provide an optical security device as a composite/laminate structure to be applied e.g. to a package such as when the package is opened an image presented by the device, and associated optical effect, is caused to disappear. The device is therefore particularly effective as a tamper evident device. Such device may be applied to containers, tubes, bottles and various other packages for the purpose of sealing the container as a tamper evident label, seal or tag.

The first and second parts of the device are preferably joined via an adhesive forming an optically and chemical stable and transparent structure. The first part comprises optical elements comprising lenticular lenses, while the second part comprises an image/pattern (an ultra-fine pattern of micro-features) printed on it. As long as the micro-optic elements layer and the micro-feature layer remain in close contact and in mutual positioning/alignment, spatially, as an integral layer as they were manufactured held in position/alignment by the optically transparent adhesive between them, then a viewer will see special optical effects (e.g. a floating or 3D appearance of the Moire fringes and a colour/image flip when the viewer changes the angle of view).

However, when one pulls the tab attached with the first part of the seal, e.g. in order to open a lid of flap of the container sealed by the seal, the first part (top layer) of the structure separates from the second part (bottom layer) and the special optical effect mentioned above disappears. Not only the effect disappears, when the two layers are not in close contact, once the two layers are separated the effect cannot even be regenerated by attempting to re-position/realign without exceptional/prohibitive effort or the use of specialist tools (e.g. a microscope), and therefore the optical affect disappears quasi-permanently. The optically transparent adhesive may also be arranged to undergo a visible colour change when exposed to air as a result of separating the layers of the device.

The peelable adhesive layer is configured and arranged such that when the first part and the second part are initially adhered together, during manufacture of the device, the adhesive shows a stronger adhesive strength than is provided by the adhesive layer in the final device resulting from completion of the manufacturing process. In particular, the adhesive is designed such that the first part and the second part, once initially adhered together during the manufacturing process, cannot be pulled apart subsequently during the manufacturing process without significantly distorting the two parts/layers. However, as a final or subsequent stage of the manufacturing process, after the completion of one or more intervening manufacturing processes subsequent to the initial adhesion step, the adhesive is altered to reduce (but not remove) its adhesive strength. The reduced strength is consistent with an adhesive strength necessary to maintain the integrity of the device when it is applied to a package/object, but to allow separation of the first and second parts of the device by a manual peeling action as described above.

The adhesive strength may be substantially and appropriately reduced, during this final manufacturing stage, by a thermal or UV treatment of the adhesive to alter it chemically to reduce its adhesiveness appropriately, thus allowing the layers to separated manually without requiring application of appreciable pulling force. Thus, the adhesive displays strong adhesive properties as long as it is required to be strong. Before the UV exposure or thermal treatment, the peel strength may be 500 gm/inch (19.69 kg/m) or more, preferably may be 750 gm/inch (29.53 kg/m) or more. After exposing the film to UV or UV and heat both, the tackiness is substantially reduced, and the peel strength may be not greater than 300 gm/inch (11.81 kg/m), and even more preferably in the range of 50 m/inch to 250 gm/inch (1.97 kg/m to 9.84 kg/m).

The optically transparent plastic layers of the first part and the second part of the device, may be any plastic layer of substantial transparency and mechanical stability. Preferred examples include (but not limited to these): Polyethylene terephthalate (PET), Polypropylene (PP), Oriented polypropylene (OPP), Biaxially oriented polypropylene (BOPP), polycarbonate (PC) and Acrylic (PMMA). The plastic layer may be a plastic film. The two plastic layers may be of same thicknesses or may be of different relative thicknesses. The preferred thickness of each of the films is between 5 microns and 100 microns, and preferably between 10 microns and 50 microns. For practical considerations, it is preferable to that the film used in the first part has a different thickness than the film used in the second part. The film used in the first part may, for example be thinner than the film used in the second part. This may render it more flexible to implement the aforesaid peeling action. One or both of the plastic films may be plain, e.g. for receiving a said printed layer of image elements, as described above. Alternatively, one or each of the plastic films may be pre-patterned optically, pre-printed or pre-treated in any other fashion, to provide an array of image elements according to the invention (e.g. as an alternative to printing the image elements upon the film via a printed layer).

The optical adhesive can be of any chemical type. However, a solvent-less or a solvent-based acrylic adhesive is preferred for practical purposes. The adhesive preferably initially has a strong tack when used to hold the first part and the second part of the device together during the initial manufacturing process. The adhesive preferably initially comprises a proportion of unreacted acrylic or vinyl groups present. This adhesive may initially be applied to only one of the first part and the second part of the device before the two parts are brought together and adhered to each other via the adhesive. Alternatively, both of the first part and the second part of the device may have such adhesive initially applied to them and the two parts may be adhered together by bringing the two adhesive-bearing parts into contact. The adhesion of the first part to the second part initially, may be performed in presence of heat and/or pressure to lead to a sandwich of high clarity with few (or fewer) defects, or desirably with no defects of consequence.

This sandwich may then be used as a product upon which to print an array of optical focussing elements (e.g. lenses) with appropriate optical properties. These optical properties may include: a specific focal length; a specific optical aperture; a specific geometry. The array of optical focussing elements may comprise single design/structure or type of optical element, or may comprise multiple different such designs/structures or types. Examples include a lenticular lens array (e.g. with an optical surface curved in only one plane). Such lenses can be designed by various optical design programmes (e.g. 'Zemax' or 'ASAP') using methods well known to an optical design engineer. These lenses of the array of lenses may have any geometry. For example, a lens of the array may have a spherical or an aspherical geometry defined by a specific Conic constant. Preferably, lenses with Conic constants having a value of between $-0.1$ and $-1$ are employed in the array of lenses.

The required lens geometries may be machined on a replication tool using any of the methods of manufacturing lenses readily available to the skilled person. For example, diamond turning may be employed, using an appropriately fashioned micro-machining tool, or specialised laser machining techniques may be used, or photolithography may be used, of melt-flow or screen printing techniques are just some of the commonly used industrial methods for lens manufacture or lens array manufacture. The shape of the replication tool may be that of a cylindrical drum or it may be a flat piece of appropriately selected metal, plastic or alloy. The pattern on the tool may be transferred onto a plastic layer/film using a selected UV curing optical formulation of an appropriate refractive index using a process known as UV embossing or UV cast cure.

An appropriately designed print pattern defining the aforesaid array (or sub-array) of image elements defining a pattern, may then be applied on the underside of the sandwich of layers of the device so far manufactured, assuming the topside of the sandwich is the one bearing the lens array/pattern. The selection of print pattern depends on the type of lenses used. When using lenticular lenses, the print pattern preferably comprises an array(s) of fine lines with linewidths equal to or smaller than one half of the lens aperture. Each line may be arranged to extend in a direction parallel to the longitudinal length of the lenticular lens with which it is in positioning/alignment. Each such fine line may preferably be positioned so as to be at least partly to one side of the principal optical axis of the lens with which it is in positioning/alignment (e.g. to permit different neighbouring elements to be viewed from different sides of that axis).

The print pattern may be an array of image elements (e.g. lines/dots/symbols) of sizes/diameters may be less than 100 μm, or less than 50 μm, or less than 25 μm. The pattern may be such that the image elements collectively form an image whereas, regions where there are no image elements may collectively present no image (or a different image to that collectively presented by the image elements). Any print method capable of printing fine lines or dots or other image elements can be used for this purpose. The examples of such methods include: lithography, flexography, gravure or inkjet methods, or a custom variation of these generic methods. The print pattern may comprise a single colour graphic. A single colour graphic may be followed by (e.g. back-coated) an overall cover coating comprising a different colour to that of the printed pattern, such as a complementary second colour, leading to a two-colour effect whereby a printed pattern presents one colour and those parts between image elements of the printed pattern present the other colour of the cover coating. Alternatively, the optical effect described thus far may also be combined with/complemented by a colour graphic printed using standard methods. Such multi-colour graphic may be printed at the front, at back or in any of the layers in between.

The printing operation may be implemented soon after the manufacturing of the lens array, or it can be done as a separate operation, including using a different machine.

The lenses as in the case discussed above with reference to FIG. 1, are exposed to air. In another implementation, the lenses are surrounded by another material of refractive index lower than 1.45 and preferably between around 1.30-1.40 (instead of air, with refractive index of ~1). Such lenses may be manufactured using a UV curable material of refractive index of greater than 1.55, preferable greater than 1.6 and in particular around 1.65 or more. After the lenses are manufactured, a layer of low refractive index material (of RI<1.4 and preferably around 1.35-1.37) is coated over the top of lenses and UV cured leading to lenses buried under a planer layer. The required printed array of image elements may then be printed on the reverse side of sandwich of layers, as explained above.

A desired property of the adhesive layer used in the process of laminating together the first and second parts of the device, is that it is subsequently caused to lose its tackiness substantially on exposure to UV light or to heat. This means that after the laminate has been exposed to UV for during the manufacturing of lenses of the lens array, and the printing of the array of image elements, the tackiness of the adhesive is substantially reduced. As a result, the first part and the second part of the device/laminate can easily be pulled apart from each other with a little force. Further, the UV dose required for the implementing the required reduction of tackiness of the adhesive, can be tailored by careful selection of its chemical formulation. In one implementation, the adhesive may be such that it is substantially not tacky after the process of manufacturing of lenses of the lens array and application of the print pattern. In another implementation, the laminate may be additionally exposed one or more times to appropriate dose of UV light with or without subsequent heat treatment, before becoming substantially non-tacky. This UV exposure may be done when needed including much later after the main manufacturing operation explained above.

In an alternative implementation, the adhesive is such that the exposure to an appropriate dose of UV or heat leads to degradation of mechanical properties of the adhesive such that it becomes brittle. In yet another implementation, the adhesive may be such that once the seal is opened, and the first and second parts of the device are separated, the exposure of the adhesive to air/moisture leads to colouration or discolouration of the adhesive.

When the two layers of the device (e.g. label) are separated as a result of tampering, the interface and the adhesive at the interface is exposed to atmospheric air/oxygen and moisture. Any suitable mechanism that leads to a change of colour on exposure to air or moisture when the label is tampered with in this way can be used for the purpose of tamper proofing. Several such mechanisms described here as example. Other mechanisms would be readily apparent to the skilled person. A preferred implementation of such indicators comprises an indicator ink including: an UV absorbing semiconducting photo-catalyst, a redox indicator dye, a mild reducing agent as the sacrificial electron donor, and an encapsulating polymer. This indicator ink may be coated onto one of the optically transparent layers (e.g. PET layers) of the laminate, or at the top of the adhesive used for laminating the two layers before the lamination. When the ink is exposed to air/oxygen during the coating stage, it will show the blue characteristic colour of the ink. After the ink is sealed within the laminate structure, as formed by bringing the layers of the laminate together, the ink may then be caused to lose its colour rapidly (e.g. in $<30$ seconds) by being exposed to UVA light. The ink may comprise e.g. made of titanium dioxide, a blue, solvent-soluble, coloured ion-paired methylene blue dye, glycerol and the polymer. Further, the layer remains colourless in the absence of UV, while sealed within the laminate structure, only to regain its original colour when exposed to oxygen again once the laminate structure is broken apart by separating its layers to expose the ink. This provides an UV-activated mechanism to switch the indicator "on" at any time, returning to its original blue colour upon exposure to air. In the latter step the rate of colour recovery is proportional to the level of ambient oxygen and the same film can be UV-activated repeatedly.

A typical ink formulation may consist of: 10 gm of 5 wt. % aqueous dispersion of nano-particulate anatase titania, to photosensitize the reduction of methylene blue (2 gm of a 5 wt. % aqueous solution) by glycerol or triethanolamine (0.6 gm) and a 20 g of 10 wt % aqueous solution of hydroxyethyl cellulose as the polymer encapsulation medium. This solution may be well mixed and kept in sealed bottles in the dark. The ink can then be printed (or simply applied) to one of the optically transparent layers (e.g. PET film) before lamination. The colour of this ink at this state is blue. The ink gets activated upon the exposure to UV upon which its colour fades and remains bleached in the absence of oxygen. The colour recovers to its original colour by exposure to oxygen when the two layers of the laminate are separated in an act of tampering (or intended opening). The indicator may be reusable, and it may be irreversible. Upon irradiation with UVA light, ultra-bandgap illumination of the $TiO_2$ particles creates electron-hole pairs. The photo-generated holes, h+, oxidize the mild sacrificial electron donor glycerol to glyceraldehyde. The remaining photo-generated electrons, $TiO_2$ reduce the redox-sensitive dye, DOx (or methylene blue) to a reduced form, DRed (leuco-methylene blue) that has a different colour to DOx. These components may be encapsulated between the two optically transparent layers (e.g. PET) of the laminate or in a layer containing appropriate polymer (e.g., Hydroxyethyl Cellulose, HEC).

As an alternative method, the adhesive polymer itself may be used as the host for the ink in place of Hydroxyethyl Cellulose. Another alternative indicator ink formulation may comprise of: 40 mg of thionine acetate, 0.6 gm of glycerol and a 0.6 gram of Degussa, P-25 $TiO_2$ powder, which contains anatase and rutile phases in a ratio of about 3:1 as semiconducting photo-catalyst. These components may be added to 3.2 gram of a 90% ethanol solution and dispersed by 5 min of ultrasonication. A quantity of (e.g. 0.5 ml) the resulting ink may be applied onto one of the optically transparent layers (e.g. PET) before the process of lamination and allowed to dry. After drying the coated film may be dipped in 1% alginate solution using dip coating.

The composite micro-optic film thus produced may then be converted into labels using the process described above.

The widths of image elements (e.g. printed lines or dots) may be equal to or less than about ½, or about ⅓, or about ¼, or about ⅕, or about ⅙ etc. of the aperture diameter of the associated lens. It is preferable to have thinner labels, and preferably thinner than 100 microns, much more preferably thinner than 50 microns. Preferably, the maximum width of an image element is 50 microns, and more preferably the width of an image element is less than 25 microns.

In preferred embodiments of the invention, the adhesive used for the lamination of the two transparent plastic layers of the device (one bearing at least the array of optical focussing elements, the other bearing at least an array of image elements) is a stronger adhesive when the device is being assembled, but is rendered less adhesive to convert the assembly into a suitable tamper evident security device appropriately ready for end use. To this end, the adhesive is preferably such that it may be rendered less tacky to permit the first part and the second part of the device to separate or fall apart on the application of any stretch or peel force to the device.

Release Layer (Adhesive) Example:

The following scheme may be used to achieve an adhesive suitable for the release layer (4) of FIG. 1 and FIG. 2.

A formulation may be prepared using one of more monomers or oligomers, at least 80 weight % of which have a glass transition temperature ($T_g$) of 20 degrees Celsius or less. Examples of such low $T_g$ monomers are: Ethyl Acrylate, Ethyl Hexyl Acrylate (EHA), 2(2-ethoxy ethoxy) ethyl acrylate (EOEOA, SR 256 from Sartomer), Phenylthioethyl Acrylate (PTEA), Octadecyl Acrylate (ODA), Isooctyl Acrylate, Phenoxyethyl Acrylate, Isobutyl acrylate, 4-Hydroxybutyl Acrylate, Ethoxylated nonyl phenol acrylate (CD504 from Sartomer), Isotridecyl Acrylate, Lauryl Acrylate, Tetrahydrofurfuryl Acrylate, Ethoxylated Neopentyl Acrylate, 2-Methoxyethyl acrylate, Or the corresponding methacrylate.

Examples of low $T_g$ oligomers are (but are not limited to): Aliphatic Urethane Diacrylates (such as Ebecryl 230, 270, 8411 and 8296 from Allnex (formerly Cytec), Qualicure GU3001Z, GU3010Z, GU3030Z, GU3290M, GU3300W and GU3300Z from Qualipoly Chemicals, Taiwan), Aromatic Urethane Acrylate (Such as Ebecryl 4827 from Allnex, formerly Cytec), Polyester Aromatic Urethane Diacrylates (Such as Qualicure GU3701W from Qualipoly Chemicals, Taiwan), Polyether Acrylate (Ebecryl 81 from Allnex, formerly Cytec), Epoxy Acrylate (Ebecryl 3212 from Allnex, formerly Cytec). There also are a range of Urethane Acrylate Oligomers from Sartomer (e.g., Sartomer CN934, CN 962, CN964, CN965, CN966H90, CN972, CN973H85 and CN980 or Photomer 6629, 6630, 6576 from IGM Resins).

The remaining 20% of the formulation can consist of other normal single functional acrylic monomers or oligomers.

Furthermore, 1% to 7% (by weight of the content of monomers/oligomers) of a suitable free-radical photo-initiator may be added to this mixture and thoroughly mixed. Suitable examples of the commercially available photo-initiators include (but are not limited to): Irgacure 184, 651, 819, 907, 1173, 2959 from Ciba Geigy or Esacure KIP100F from Lamberti, USA.

Furthermore, 5% to 20% (by weight) of one or more of glycidyl containing monomers and a suitable photo-acid generator (1-6% of the glycidyl containing monomer by weight) may be also added to the above formulation mixture and thoroughly mixed.

Examples of glycidyl group containing monomers are: Glycidyl Acrylate and Glycidyl Methacrylate. Further, up to 5% (by weight) of the glycidyl containing part can also come from either bifunctional epoxy resin such as bisphenol. A type epoxy may comprise; a novolak epoxy resin such as phenol novolak epoxy resin or cresol novolak epoxy resin or the like. Moreover, an ordinarily-known epoxy resin can be used, examples of which include polyfunctional epoxy resin, glycidylamine epoxy resin, heteroring-containing epoxy resin, or alicyclic epoxy resin.

Examples of well-known photo-acid generators are: Methoxyphenyldiphenylsulfonium triflate, (4-tert-Butylphenyl)diphenylsulfonium triflate, Diphenyliodonium hexafluorophosphate, Diphenyliodonium nitrate, Diphenyliodonium perfluoro-1-butanesulfonate electronic grade, Diphenyliodonium triflate, (4-Fluorophenyl) diphenylsulfonium triflate, N-Hydroxynaphthalimide triflate, (4-Iodophenyl) diphenylsulfonium triflate, (4-Methoxyphenyl) diphenylsulfonium triflate, (4-Methylphenyl) diphenylsulfonium triflate, (4-Methylthiophenyl) methyl phenyl sulfonium triflate, (4-Phenoxyphenyl) diphenylsulfonium triflate, (4-Phenylthiophenyl) diphenylsulfonium triflate, Triarylsulfonium hexafluorophosphate salts, Triphenylsulfonium triflate, Tris (4-tert-butylphenyl) sulfonium triflate.

The tackiness of the formulation can further be enhanced by using additional Rosin or hydrocarbon type tackifier resins to the above formulations. Examples are: C9 hydrocarbon resin (Norsolene S115 C9 from Cray Valley) or Staybelite Resin-E, Tacolyn 3179 H resin or Foral™ AX-E resins from Eastman.

Further, one or more of inorganic fillers may be used, such as: alumina, aluminium nitride, boron nitride, crystalline silica, amorphous silica, magnesium oxide, magnesium carbonate or calcium carbonate. These may also be added to the above mixture.

There exist range of coating additives, available to the skilled person, which are typically used as additives to UV coating formulations, for achieving various process benefits. Use of various surfactants (such as Tego Twin 4100 or Tego Wet 270 from Evonik or Additol VXL 4930 from Allnex, formerly Cytec) and Antioxidants (such as Irganox 1010 from Ciba-Geigy Co.) is well known to a practitioner of UV coatings. Such additives can also be added to the formulation described above, according to preferred embodiments of the invention, as appropriate.

An alternative approach for the preparation of desired adhesive can be to use a pre-formulated polymer solution as explained below.

An acrylate (pre)polymer can be formed by either UV or thermal polymerisation of monomers and oligomers. This may be done in the presence of appropriate solvents in case of thermal polymerisation. However, if UV polymerisation is used, the solvent may or may not be used.

For achieving the adhesive using thermal polymerisation, one or more single functional monomers with glass transition temperature ($T_g$) below 20 degree Celsius, may be mixed and one or more solvents may be added to these in an appropriate ratio. Furthermore, 2%-5% (by weight) of a thermal initiator may be also added to it. The reaction mixture may then be reacted at elevated temperature for 4 to 12 hours, while the nitrogen is being passed through the reactor. At the end of the reaction a viscous polymer solution with desired concentration may be obtained.

The examples of such single functional low $T_g$ monomers are given above.

The above reaction may also be conducted in presence of a UV initiator (rather than a thermal initiator) and by exposing the reaction mixture to UV light (instead of elevated temperature) for 5 to 60 minutes (depending upon the intensity of UV light) under constant stirring. UV polymerisation may also lead to a similar polymer with required viscosity and chain length as the thermal polymerisation process described above.

The following process may be used to formulate a solvent-less pre-polymer with required viscosity, and chain length. A pre-determined formulation consisting of low glass transition temperature ($T_g$) single functional monomer (e.g. chosen from the list above) may be weighted in a round bottom flask and 1% to 6% (by weight) of photo-initiators (e.g. only one or a mixture of a plurality) is be added to it. The flask may be connected to a rotary evaporator and nitrogen gas is be bubbled through the mixture. A high-powered UV lamp is placed in front of this assembly and while the flask is rotating the mixture is exposed to UV light for 5 to 20 minutes. The increase in viscosity can be visually monitored and as soon as the viscosity appears to be in the expected range, the UV light and nitrogen gas may be switched off and the flask may be flushed with Oxygen instead, in order to stop the UV polymerisation reaction. A pre-polymer with required viscosity and molecular weight is thus formed, which can be used for subsequent coating applications.

Furthermore, 5% to 25% of one or more of a common single functional monomer can also be mixed to the solvent-containing or solvent-less, pre-polymers formulated by thermal or UV polymerisation as described above.

Alternatively, 10 to 80% of one or more of low $T_g$ oligomers (examples of which are given above) can also be added to the above prepolymers.

In the situation when either a single functional monomer as described above, or a low $T_g$ Oligomer as described above, or both, are present, then 1% to 7% (by weight of the content of monomers/oligomers) of a suitable free-radical photo-initiator may also added to this mixture. Suitable examples of the commercially available photo-initiators are given above.

Further, 5% to 20% (of the total formulation weight) of one or more of glycidyl containing monomers and a suitable photo-acid generator (1%-6% of the glycidyl containing monomer by weight) may also be mixed to the above formulation mixture. The examples of the Glycidyl containing monomers/oligomers as well as those of photo-acid generators are also as described above. Furthermore, the usual coating additives as mentioned above (and is well known to a practitioner in the area of coatings and adhesive) can also be added to the resulting formulation.

The resulting adhesive formulation can then be used for the purpose of laminating together the first part and the second part of the device. For this purpose, the formulation may be coated on a layer(s) of the device, using any of the common coating methods and then laminated with another layer(s) of the device, and UV cured. In implementations using a solvent-containing pre-polymer, the adhesive coating may be exposed to heat (to drive the solvents out) prior to the lamination process and UV curing process.

This laminated part may then be used for the purpose of manufacturing/applying thereto the array of optical focussing elements (e.g. lenses) on one side and printing image elements on the reverse side. The resulting film can then also be converted to a label as described above, e.g. including the process of die and/or kiss cutting of one/some of the layers of the device, as required.

The label can then be exposed to a temperature of between 50 degrees Celsius and 100 degrees Celsius, or to a UV light dosage, for e.g. between 2 minutes and 10 minutes. This exposure to heat (or UV light) allows the photo-acid created during the previous exposure of UV light described above, to lead to ring opening polymerisation of the glycidyl groups. This further cross-linking of glycidyl groups leads to further cross-linking of coated layer and thus reduces or eliminates the tackiness of the adhesive.

The device so prepared can then be applied to the packages for the purpose of a tamper evident device.

It is to be understood that the security device according to any embodiment described above, may function as an anti-counterfeit device (as well as a temper-evident device) by virtue of the provision of the particular 3D visual effect of Moire fringes. The absence of such a visual effect on a security device signals that the device in question is not according to the invention and is counterfeit.

Figure 11:
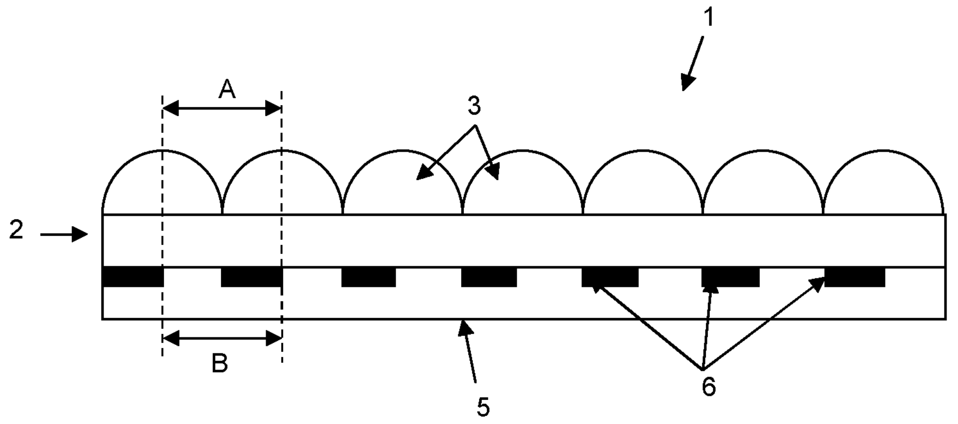
FIG. 11 schematically illustrates a cross-sectional view of an anti-counterfeit device according to an embodiment of the invention.

Furthermore, it is to be understood that the security device according to any embodiment described above, may function as an anti-counterfeit device without being a temper-evident device, by virtue of the provision of the particular 3D visual effect of Moire fringes. This may be achieved by either forming the device as described above but omitting the release layer (4) and, instead, bonding the second (patterned) part (5) directly to the first part (2) such that the two are fixed together permanently, or by substituting the release layer (4) with a permanently bonding adhesive with which to fix the first (2) and second (5) parts together. The peel tab (7) may be omitted in these cases, as unnecessary. FIG. 11 schematically illustrates a cross-sectional view of an anti-counterfeit device according to an embodiment of the invention in which the second (patterned) part (5) is bonded directly to the first part (2) such that the two are fixed together permanently.

Figure 12:
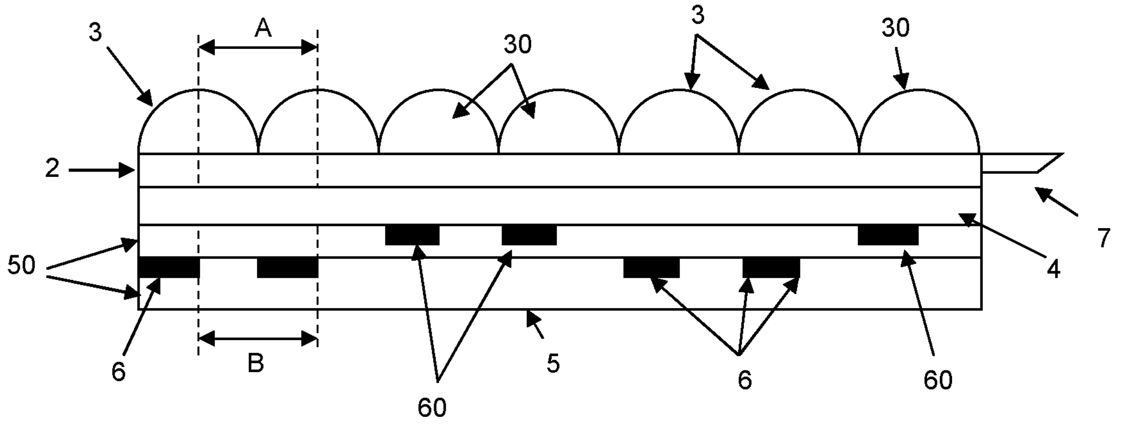
FIG. 12 schematically illustrates a cross-sectional view of a tamper-evident device according to an embodiment of the invention.
Figure 13:
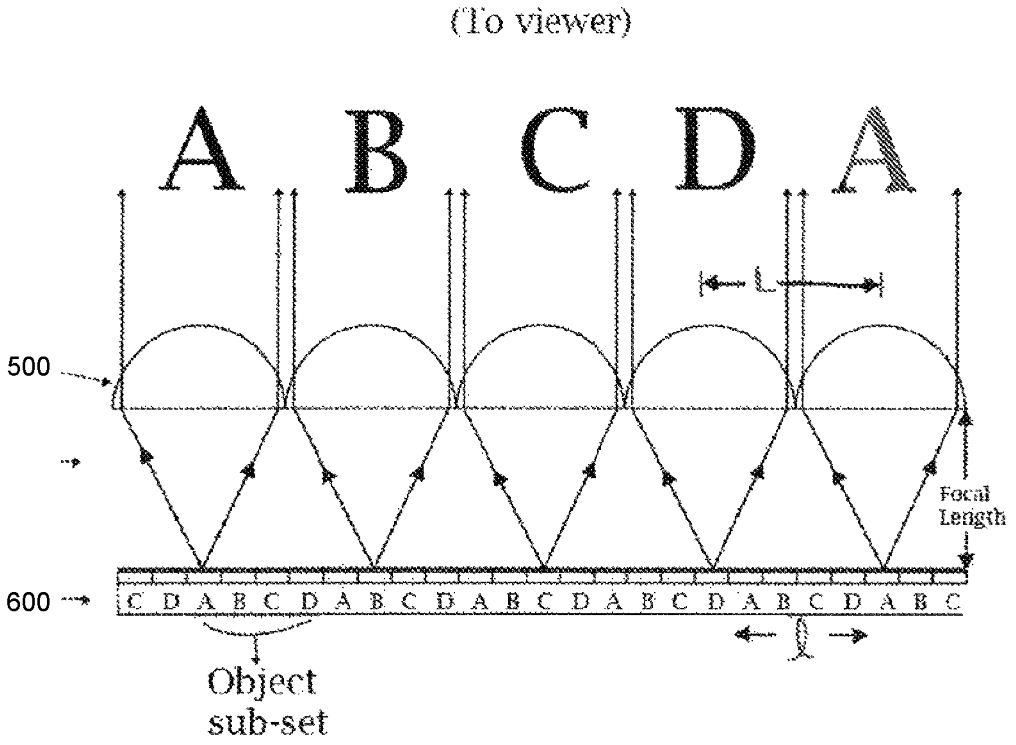
FIG. 13 schematically illustrates a Moire magnification process.

FIG. 12 shows a schematic diagram of a tamper-evident device in which the second part (5) of the security device comprises a laminate of two sub-layers (50). Each of the two sub-layers may comprise a flexible transparent plastic layer. A first sub-layer of the two sub-layers has printed upon it a first sub-array of image elements (60) disposed upon an upper surface of a flexible transparent plastic layer (50, upper layer) of the second part. The first part of the security device comprises a first sub-array of optical focusing lenses (30) disposed on the outer surface thereof. Each image element (60) of the first sub-array of image elements is in position/alignment with a respective optical focusing lens element (30) of the first sub-array of optical focusing lenses. In addition, each image element of the first sub-array of image elements (60) is positioned to reside at the focal length/point of the lens (30) with which it is in position/alignment. Similarly, the second part (5) of the security device comprises a second sub-layer of the two sub-layers (50) which has printed upon it a second sub-array of image elements (6) disposed upon an upper surface of that part. The first part (2) of the security device also comprises a second sub-array of optical focusing lenses (3) disposed on the outer surface thereof. Each image element (6) of the second sub-array of image elements is in position/alignment with a respective optical focusing lens element (3) of the second sub-array of optical focusing lenses, and is also positioned to be substantially coincident with the focal length/point of the lens (3) with which it is in position/alignment.

Each of the first and second sub-arrays of image elements (6, 60) is disposed upon a surface of a respective one of the two sub-layers (50) of the second part of the security device, as a printed layer of graphics. A layer of optically transparent and peelable adhesive (4) is disposed between the underside of the first part (2) and the upper side of the sub-layer of the second part containing the first sub-array of image elements (60). The two sub-layers (50) of the laminar second part (5) are bonded together permanently by any suitable means (e.g. an adhesive). The first part (2) of the device may be separated from the second part (5) by release from the adhesive layer (4) by applying a pulling force manually/mechanically to a tab (7) attached to the first part. The consequence of such release is to de-align the optical focusing elements (3, 30) of the first and second lens sub-arrays relative to the image elements (6, 60) of the first and second sub-arrays of image elements. The optical image and/or optical Moire fringe effect, collectively defined by the second sub-arrays of lens elements (3) and associated image elements (6) may be configured to visibly differ from the optical image and/or optical Moire fringe effect collectively defined by the first sub-arrays of lens elements (30) and image elements (60). This may be achieved by applying different respective values of the ratio (A/B) and/or absolute difference Δ to each sub-array of image elements, as desired.

The focal length of the optical focusing elements of the first sub-array of lenses (30) is shorter than the focal length of the optical focusing elements (3) of the second sub-array. Each optical focussing element defines a focal length which substantially matches the separation between that optical focussing element and the array of image elements it is aligned with.

The invention claimed is:

1. A security device comprising:

a first part including an optically transparent layer including a repeating first array of separate optical focusing elements including lenticular lenses having translational symmetry wherein a pitch distance between repeated elements in the first array is a first pitch value (A);

a second part separate from the first part and including a repeating second array of separate image elements having translational symmetry and collectively defining an image viewable through the first part wherein a pitch distance between repeated elements in the second array is a second pitch value (B); and wherein the optical focusing elements are aligned with respect to the separate image elements to reveal a blended whole image together with one or more Moire fringes that show 3-dimensional (3D) depth as the image viewing angle changes, wherein the blended whole image is different from each of the separate image elements, wherein the ratio (A/B) of the first pitch value and the second pitch value has a value $A/B=n+\Delta$, that differs from a positive integer value, n, according to an absolute difference, $\Delta$, not exceeding 0.01 and not less than 0.001.

2. A security device according to claim 1, wherein the first part is mechanically separable from the second part by release of a release layer, and wherein the repeating second array of separate image elements includes two sub-arrays each collectively presenting a distinct image and vertically separated from one another by a transparent layer.

3. A security device according to claim 2, in which said release layer comprises an adhesive layer arranged to be not re-adherent to the first part of the second part after a said release of the release layer from the first part or the second part, respectively.

4. A security device according to claim 2, in which the first part, the second part and the release layer collectively define a laminate.

5. A security device according to claim 2, in which the release layer is arranged such that a peel strength required to release first part from second part is not greater than 300 gm/inch (11.81 kg/m).

6. A security device according to claim 1, in which each one of said optical focusing elements is aligned to reveal therethrough a view of a respective one of said image element(s), and each said optical focusing element defines a focal point coinciding with the location of a respective said image element with which it is aligned.

7. A security device according to claim 1, in which some or each of said optical focusing elements define a respective optical aperture the width dimension of which does not exceed 100 μm.

8. A security device according to claim 1, wherein a width dimension of the blended whole image is at least five times as large as an aperture width of each optical focusing element.

9. A security device according to claim 1, wherein a width dimension of the blended whole image is at least twice as large as an aperture width of each optical focusing element.

10. A security device according to claim 1, in which some or each of said image elements has width dimension not exceeding 50 μm.

11. A security device according to claim 1, defining a label in which an adhesive layer is disposed on a surface of the device to define a label, wherein the adhesive layer is tacky for affixing the label to a surface.

12. A security device according to claim 1, in which the one or more of the respective images comprises one or more icons, numbers or a combination of icons and numbers.

13. A security device according to claim 12, wherein the ratio A/B in respect of one sub-array is $A/B=n+\Delta$ while the ratio A/B in respect of the rest of the image elements, or in respect of one or more other sub-arrays in the two or more sub-arrays, is $A/B=n-\Delta$.

14. A security device according to claim 1, in which the second pitch value (B) for one of the two or more sub-arrays differs from the second pitch value (B) for one or more other sub-arrays in the two or more sub-arrays.

15. A method of manufacturing a security device comprising:

providing a first part including an optically transparent layer including a repeating first array of separate optical focusing elements including lenticular lenses having translational symmetry wherein a pitch distance between repeated elements in the first array is a first pitch value (A);

providing a second part including a repeating second array of separate image elements having translational symmetry and collectively defining an image viewable through the first part wherein a pitch distance between repeated elements in the second array is a second pitch value (B) wherein the ratio $A/B=n+\Delta$, that differs from a positive integer value, n, according to an absolute difference, $\Delta$, not exceeding 0.01 and not less than 0.001, wherein the optical focusing elements aligned with respect to the separate image elements to reveal a blended whole image together with one or more Moire fringes that show 3-dimensional (3D) depth as the image viewing angle changes, wherein the blended whole image is different from each of the separate image elements.

16. A method according to claim 15, wherein the first part is mechanically separable from the second part by release of a release layer, and wherein the repeating second array of separate image elements includes two sub-arrays each collectively presenting a distinct image and vertically separated from one another by a transparent layer.

17. A method according to claim 15, further including disposing a second adhesive layer on a surface of the device to define a label, wherein the second adhesive layer is tacky for affixing the label to a surface.

18. A security device comprising:

an optically transparent layer including a repeating first array of separate optical focusing elements including lenticular lenses having translational symmetry wherein a pitch distance between repeated elements in the first array is a first pitch value (A);

a repeating second array of separate image elements having translational symmetry and collectively defining an image viewable through the first part wherein a pitch distance between repeated elements in the second array is a second pitch value (B); and an optically transparent release layer between the first part and the second part which retains the optical focusing elements aligned with respect to the separate image elements to reveal a blended whole image together with one or more Moire fringes that show 3-dimensional (3D) depth as the image viewing angle changes, wherein the blended whole image is different from each of the separate image elements, and wherein a width dimension of the blended whole image is at least twice as large as an aperture width of each optical focusing element, wherein the ratio (A/B) of the first pitch value and the second pitch value has a value $A/B=n+\Delta$, that differs from a positive integer value, n, according to an absolute difference, $\Delta$, not exceeding 0.01 and not less than 0.001, wherein the repeating second array of separate image elements comprises two or more sub-arrays of separate image elements, each one of which collectively presents a distinct respective image, the two or more sub-arrays including a first sub-array having separate image elements complying with the ratio $A/B=n+\Delta$ and a second sub-array having image elements complying with the ratio $A/B=n-\Delta$, and wherein the second sub-array is adjacent the first sub-array or embedded within the first sub-array.

* * * * *